United States Patent
Rofheart et al.

(10) Patent No.: US 7,058,414 B1
(45) Date of Patent: Jun. 6, 2006

(54) METHOD AND SYSTEM FOR ENABLING DEVICE FUNCTIONS BASED ON DISTANCE INFORMATION

(75) Inventors: Martin Rofheart, Washington, DC (US); John W. McCorkle, Laurel, MD (US)

(73) Assignee: Freescale Semiconductor, Inc., Austin, TX (US)

( * ) Notice: Subject to any disclaimer, the term of this patent is extended or adjusted under 35 U.S.C. 154(b) by 649 days.

(21) Appl. No.: 09/685,202

(22) Filed: Oct. 10, 2000

Related U.S. Application Data

(60) Provisional application No. 60/217,099, filed on Jul. 10, 2000, and provisional application No. 60/207,225, filed on May 26, 2000.

(51) Int. Cl.
*H04Q 7/20* (2006.01)

(52) U.S. Cl. .................. 455/456.4; 455/411; 455/456.1; 455/456.3

(58) Field of Classification Search .................. 455/421, 455/456.1, 456.4, 67.16, 456.2, 456.3, 456.5, 455/456.6, 457; 340/539.1, 539.11, 539.13; 342/453, 463, 464, 465
See application file for complete search history.

(56) References Cited

U.S. PATENT DOCUMENTS 5,455,593 A * 10/1995 Ross
5,748,891 A 5/1998 Fleming et al.

(Continued)

FOREIGN PATENT DOCUMENTS

EP 0 676 650 10/1995
WO WO 00/04677 1/2000

OTHER PUBLICATIONS

U.S. Appl. No. 60/207,225, filed May 26, 2000, McCorkle.
U.S. Appl. No. 60/217,099, filed Jul. 10, 2000, Miller.

(Continued)

*Primary Examiner*—David Hudspeth
*Assistant Examiner*—Huy D Nguyen
(74) *Attorney, Agent, or Firm*—Posz Law Group, PLC

(57) ABSTRACT

A method, device and computer readable medium for enabling and blocking communications with a remote device based on a distance of the remote device. The method on which the device and computer readable medium are based includes transmitting a message from a local device to a remote device via an ultra wide band (UWB) wireless medium and receiving a response from the remote device via the UWB wireless medium. The transmitting and receiving steps are preferably performed in accordance with a Media Access Control (MAC) protocol. A distance between the local device and the remote device is then determined based on a time between the transmitting of the message and the receiving of the response and a function, such as communicating with the remote device, is performed in the local device based on the distance determined. The communication between the local device and the remote device may be enabled or disabled depending on the distance that the remote device is from the local device. In addition, the distance information for a remote device may be continually updated, or updated only if communication to the remote device are blocked. A positional map may be generated based on distance data determined for a plurality of reference points and the user may select the remote device from the positional map to enable communications to the positional map.

3 Claims, 13 Drawing Sheets

U.S. PATENT DOCUMENTS

| | | | |
|---|---|---|---|
| 5,850,449 | A | 12/1998 | McManis |
| 5,878,034 | A * | 3/1999 | Hershey et al. |
| 6,011,974 | A * | 1/2000 | Cedervall et al. |
| 6,115,409 | A * | 9/2000 | Upadhyay et al. |
| 6,195,705 | B1 * | 2/2001 | Leung |
| 6,351,246 | B1 | 2/2002 | McCorkle |
| 6,381,464 | B1 * | 4/2002 | Vannucci |
| 6,490,456 | B1 * | 12/2002 | Bogdan et al. |
| 6,505,032 | B1 | 1/2003 | McCorkle |
| 6,700,939 | B1 | 3/2004 | McCorkle |
| 6,735,238 | B1 | 5/2004 | McCorkle |

OTHER PUBLICATIONS

U.S. Appl. No. 09/633,815, filed Aug. 7, 2000, McCorkle.
U.S. Appl. No. 60/238,466, filed Oct. 10, 2000, McCorkle.
U.S. Appl. No. 09/684,401, filed Oct. 10, 2000, Miller.
U.S. Appl. No. 09/684,782, filed Oct. 10, 2000, McCorkle.
U.S. Appl. No. 09/685,195, filed Oct. 10, 2000, Miller.
U.S. Appl. No. 09/685,196, filed Oct. 10, 2000, Miller.
U.S. Appl. No. 09/685,197, Oct. 10, 2000, Miller.
U.S. Appl. No. 09/685,198, filed Oct. 10, 2000, McCorkle.
U.S. Appl. No. 09/685,199, Oct. 10, 2000, McCorkle.
U.S. Appl. No. 09/685,200, filed Oct. 10, 2000, McCorkle.
U.S. Appl. No. 09/685,203, Oct. 10, 2000, Miller.
U.S. Appl. No. 09/685,205, Oct. 10, 2000, McCorkle.
R. Comerford, IEEE Spectrum, Wireless Internet, pp. 35–41, "Handhelds Duke it out for the Internet", Aug. 2000.
G. A. Stobbs, et al., IEEE Communications Magazine, Patent and Telecommunications, pp. 98–101, "Patenting Propagated Data Signals: What Hath God Wrought?", Jul. 2000.

* cited by examiner

METHOD AND SYSTEM FOR ENABLING DEVICE FUNCTIONS BASED ON DISTANCE INFORMATION

CROSS-REFERENCE TO RELATED PATENT DOCUMENTS

This application claims benefit of priority to U.S. Provisional Application Nos. 60/207,225 and 60/217,099 filed in the United States Patent and Trademark Office on May 26, 2000 and Jul. 10, 2000, respectively The present document contains subject matter related to that disclosed in commonly owned, co-pending application Ser. No. 09/209,460 filed Dec. 11, 1998, entitled ULTRA WIDE BANDWIDTH SPREAD-SPECTRUM COMMUNICATIONS SYSTEM; Ser. No. 09/633,815 filed Aug. 7, 2000, entitled ELECTRICALLY SMALL PLANAR UWB ANTENNA; application Ser. No. 09/563,292, filed May 3, 2000, entitled PLANAR ULTRA WIDE BAND ANTENNA WITH INTEGRATED ELECTRONICS; application Ser. No. 60/207,22 filed May 26, 2000, entitled ULTRA WIDEBAND COMMUNICATION SYSTEM AND METHOD; application Ser. No. 09/685,198 filed Oct. 10, 2000, entitled ANALOG SIGNAL SEPARATOR FOR UWB VERSUS NARROWBAND SIGNALS; application Ser No. 60/238,466 filed Oct. 10, 2000, entitled ULTRA WIDE BANDWIDTH NOISE CANCELLATION MECHANISM AND METHOD; application Ser. No. 60/217,099 filed Jul. 10, 2000, entitled MULTIMEDIA WIRELESS PERSONAL AREA WORK (WPAN) PHYSICAL LAYER SYSTEM AND METHOD; application Ser. No. 09/685,203 filed Oct. 10, 2000, entitled SYSTEM AND METHOD FOR BASEBAND REMOVAL OF NARROWBAND INTERFERENCE IN ULTRA WIDEBAND SIGNALS; application Ser. No. 09/685,197 Oct. 10, 2000, entitled MODE CONTROLLER FOR SIGNAL ACQUISITION AND TRACKING IN AN ULTRA WIDEBAND COMMUNICATION SYSTEM; application Ser. No. 09/684,400 filed Oct. 10, 2000, entitled ULTRA WIDEBAND COMMUNICATION SYSTEM, METHOD, AND DEVICE WITH LOW NOISE PULSE FORMATION; application Ser. No. 09/685,195 filed Oct. 10, 2000, entitled ULTRA WIDE BANDWIDTH SYSTEM AND METHOD FOR FAST SYNCHRONIZATION; application Ser. No. 09/684,401 filed Oct. 10, 2000, entitled ULTRA WIDE BANDWIDTH SYSTEM AND METHOD FOR FAST SYNCHRONIZATION USING SUB CODE SPINS; application Ser. No. 09/685,196 filed Oct. 10, 2000, entitled ULTRA WIDE BANDWIDTH SYSTEM AND METHOD FOR FAST SYNCHRONIZATION USING MULTIPLE DETECTION ARMS; application Ser. No. 09/685,199 filed Oct. 10, 2000, entitled A LOW POWER, HIGH RESOLUTION TIMING GENERATOR FOR ULTRA-WIDE BANDWIDTH COMMUNICATION SYSTEMS; application Ser. No. 09/685,201 filed Oct. 10, 2000, entitled CARRIERLESS ULTRA WIDEBAND WIRELESS SIGNALS FOR CONVEYING APPLICATION DATA; application Ser. No. 09/685,205 filed Oct. 10, 2000, entitled SYSTEM AND METHOD FOR GENERATING ULTRA WIDEBAND PULSES; application Ser. No. 09/684,782 filed Oct. 10, 2000, entitled ULTRA WIDEBAND COMMUNICATION SYSTEM, METHOD, AND DEVICE WITH LOW NOISE RECEPTION; and application Ser. No. 09/685,200 filed Oct. 10, 2000, entitled LEAKAGE NULLING RECEIVER CORRELATOR STRUCTURE AND METHOD FOR ULTRA WIDE BANDWIDTH COMMUNICATION SYSTEM, the entire contents of each of which being incorporated herein by reference.

BACKGROUND OF THE INVENTION

1. Field of the Invention

The present invention relates generally to a method and system for enabling device functions, and more specifically to a method and system for enabling communications functions in a local wireless device based on a distance between the local wireless device and a remote wireless device.

2. Discussion of the Background

The recent proliferation of hand held computers has made data exchange between wireless devices such as mobile phones, laptops, and hand held devices more common. In this proliferation, various wireless communications technologies including infrared technology and radio frequency (RF) technology have emerged to provide the wireless connectivity between devices. With regard to infrared technology, the Infrared Data Association (IrDA) has specified several infrared communications standards to provide the wireless connectivity necessary for data exchange between devices. IrDA is a point to point narrow angle ad hoc data transmission standard designed to operate at distances of 1 meter or so. In the area of RF connectivity, Blue tooth technology has been recently proposed as an RF specification for providing a wireless communications link between devices. Blue tooth employs an omnidirectional signal transmitted at 2.4 GHz and provides a normal link range 10 cm to 10 m in non-line of sight transmission through solid objects such as walls and other structures.

A common wireless data exchange scenario is one in which the exchange will take place in a room containing a number of other wireless devices making similar data exchanges. An example is an electronic business card exchange where two people meet to exchange business cards, face to face, in a large conference room where many other people carrying wireless devices are also present in the room and making similar exchanges. As another example, a person may want to download photographs from a digital camera to a wireless kiosk in a retail store where other digital cameras and wireless devices are exchanging data. In each of these situations, the wireless devices of the intended transaction must provide some way of filtering the data of the intended transaction from other data in the area. That is, the devices of the business card exchange must provide some way of sending and receiving only the intended business card and blocking other business cards that are being exchanged in the conference room, and the kiosk must be able to distinguish the intended photographs from other data.

The IrDA infrared technology provides such a filtering function by requiring the users of the device to "point and shoot" the electronic data from the sending device to the intended receiving device. The limited range and narrow beam width of IrDA provides a way of filtering out unintended signals and ensuring communications only between intended devices. In the examples discussed above, the sender of an electronic business card would simply position his device within one meter of the receiving device, and then pointed directly at the receiving device and press a send button that transmits the electronic business card to the receiving device on an infrared beam. The camera owner would similarly point and shoot the photographs to the kiosk. As recognized by the present inventors, the infrared system is problematic, however, in that the infrared devices must be placed in a fixed location of close proximity and precise orientation while synchronization and data exchange takes place between the two devices. This positioning makes transactions with fixed structure devices such as the kiosk inconvenient. Moreover, IrDa technology requires that the data exchanging devices be within line of sight of each other making it impossible for one device to transmit an electronic business card to another device located in the intended recipients pocket or briefcase. A deficiency observed by the present inventors is that the line-of-sight nature of infrared communication links is that it requires the user's vision is a necessary step to properly orient the IR transmission beam. Thus, avoiding the possibility of being used effectively by visually impaired people, by remote "un-manned" equipment or in other scenarios where manual beam pointing is inconvenient or impossible.

On the other hand, the characteristics of the omnidirectional RF signal devices such as Blue tooth devices allows communication over relatively far distances and provides signals that penetrate solid objects. Therefore, RF devices provide maximum mobility for the user and the capability to communicate with obstructed devices. In order to distinguish intended data from unintended data, the RF device must perform a discovery operation that will find many sending devices other than the intended device. While these additional capabilities carry great benefits for the user, one problem is that the user is then forced to choose from a list of discovered devices which requires special information about the sending device such as a device bit address or name that is associated with the user of the device. Moreover, because modem RF devices have multipoint capabilities and therefore utilize security mechanisms to prevent unauthorized access, the users of the devices of the intended exchange may also have to execute security measures. These procedures are time consuming and impractical for many data exchanges such as the typical electronic business card and photo exchange discussed above.

SUMMARY OF THE INVENTION

Consistent with the title of this section, only a brief non-limiting description of the invention, and selected features of the invention is now provided. To appreciate all of the facets and features of the present invention it is recommended that the entire document be read.

Accordingly, one object of this invention is to provide a method, system and computer program product for enabling communications between wireless devices without the need for close proximity fixed orientation between the wireless devices.

Another object of the present invention is to provide a method, system and computer program product for enabling communications between wireless devices without the need for users of the devices to manually select an intended sending device.

Yet another object of this invention is to provide a method, system and computer program product for enabling wireless device communications functions based on the distance between wireless devices.

These and other objects that overcome the above-identified features of conventional systems and methods are achieved by providing a novel method, apparatus, and computer program product for enabling device functions based on distance information.

According to one aspect of the invention, the method, on which the device and computer program product are based includes transmitting a message from a local device to a remote device via an ultra wide band (UWB) wireless medium and receiving a response from the remote device via the UWB wireless medium. The transmitting and receiving steps are preferably performed in accordance with a Media Access Control (MAC) protocol. A time between the transmitting of the message and the receiving of the response is then determined and a function is performed in the local device based on the round trip time determined.

According to another aspect of the invention, the time between the transmitting of the message and the receiving of the response may be used to determine a distance from the local device to the remote device. In this aspect, the time between the transmitting of the message and the receiving of the response is determined by marking a time of the transmitting and receiving as a first time and second time respectively, and determining a difference between the first and second times. A round trip time is then determined by subtracting a processing delay from the difference between the first and second times. The processing delay may be obtained from a memory of the local device or received from the remote device. Finally, the distance from the local device to the remote device is determined by multiplying one half of the round trip time by a speed of transmission over the wireless medium. In this aspect, the function performed in the local device is communicating with the remote device based on the distance determined.

In another aspect of the present invention, communicating with the remote device based on the distance determined includes setting an authentication criteria in the local device, comparing the authentication criteria with the distance from the local device to the remote device, and enabling or blocking communications with the remote device depending on whether the distance satisfies the authentication criteria. In this aspect, information of the distance from the local device to the remote device may be periodically updated and communications with the remote device may be enabled or blocked based on the updated information. Alternatively, the distance information is periodically updated only when communications to the remote device are blocked and communications are enabled for the blocked remote device based on the updated information.

According to yet another aspect of the present invention, communicating with the remote device based on the distance determined includes determining a position of the remote device and enabling communications with the remote device based on the position determined. In this aspect, the position of the remote device is determined by determining a distance from the local device to a reference point, receiving information from the remote device indicating a distance from the remote device to the reference point and triangulating the position of the remote device based on the known distances. The local and remote devices may be displayed on a positional map including on a display of the local device and the position of these devices may be periodically changed based on updated positional information. The user of the local device may select a remote device by a touch screen input to the remote device and selected devices are indicated on the display as positional information is updated. In a variation of this aspect, the local device may determine the position of the remote device using a plurality of reference points each of which is positioned due north, south east or west of a center point of the area where the local device is located. Using an internal compass, the local device is then able to orient a positional map on the display in accordance with the direction that the local device is facing.

In any of the above aspects, the local device may communicate with a plurality of remote devices based on distance and may communicate on a secured link.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
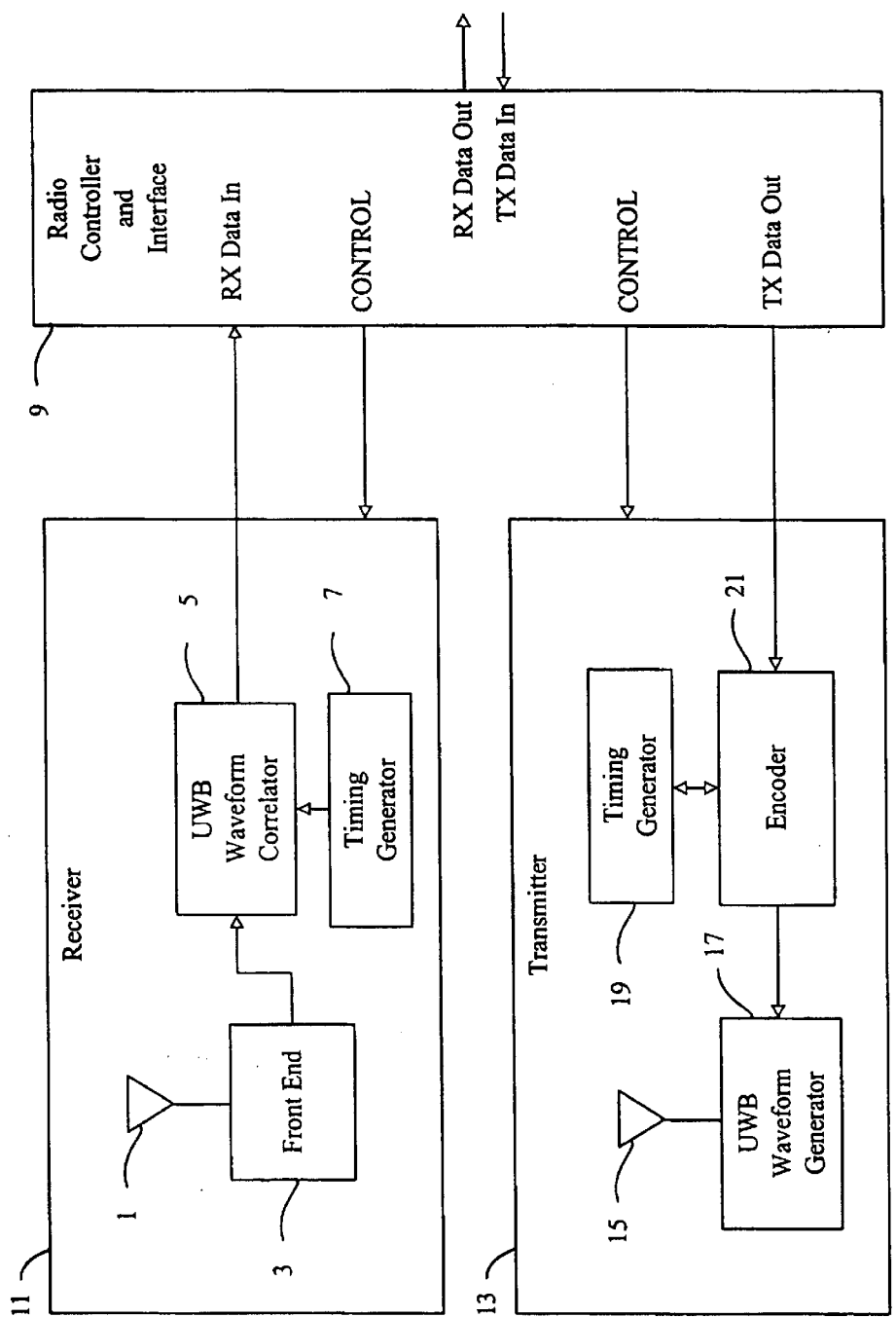
FIG. 1a is a block diagram of an ultra-wide band (UWB) transceiver, according to the present invention.

Referring now to the drawings and more particularly to FIG. 1a thereof, a block diagram of an ultra-wide band (UWB) transceiver used in accordance with the present invention is shown. In FIG. 1a, the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \leq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a1, +a2, −a2, . . . , +aN, −aN, (iii) quadrature phase signals (+1, −1, +j, −j), (iv) multi-phase signals (1, −1, exp(+jπ/N), exp(−jπ/N), exp(+jπ2/N), exp(−jπ2/N), . . . , exp(+j(N−1)/N), exp(−jπ(N−1)/N)), (v) multilevel multi-phase signals ($a_i$ exp($j2\pi\beta/N$)| a ∈{1, a1, a2, . . . , aK}, β∈{0, 1, . . . , N−1}), (vi) frequency modulated pulses, (vii) pulse position modulation (PPM) signals (possibly same shape pulse transmitted in different candidate time slots), (viii) M-ary modulated waveforms $g_{Bi}$(t) with $B_i$ ∈{1, . . . , M}, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modem Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_t \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite s based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{Bi}$ (t–T).

$$x(t) = \sum_{i=0}^{\infty} g_{B_i}(t - T_i) \tag{1}$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2}, B_{i,3}, \ldots}(t) + Im(B_{i,1}) \cdot h_{B_{i,2}, B_{i,3}, \ldots}(t) \tag{2}$$

In the above equation, function $f$ defines a basic wavelet shape, and function h is simply the Hilbert transform of the function $f$. The parameter $B_{i,1}$ is a complex number allowing magnitude and phase of each wavelet pulse to be adjusted, i.e., $B_{i,1} = a_i \angle \theta_i$, where $a_i$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes $f$ that are derivatives of a Guassian waveform as defined by Equation 3 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \tag{3}$$

In the above equation, the function $\Psi(\ )$ normalizes the peak absolute value of $f_{Bi}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes $f$ that are Gaussian weighted sinusoidal functions, as described by Equation 4 below.

$$f_{B_{i,2}, B_{i,3} B_{di\ i,4}} = f_{\omega_i, k_i, b_i}(t) = e^{-[b_i t]^2} \sin(\omega_i t + k_i t^2) \tag{4}$$

In the above equation, $b_i$ controls the pulse duration, $\omega_i$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes $f$ that are inverse-exponentially weighted sinusoidal functions, as described by Equation 5 below.

$$g_{B_i}(t) = \left( \frac{1}{e \cdot 3 * t_{r_i} + 1} - \frac{1}{e \cdot 3 * t_{f_i} + 1} \right) \cdot \sin(\theta_i + \omega_i t + k_i t^2) \tag{5}$$

where $\{B_{i,2}, B_{i,3}, B_{i,4}, B_{i,5}, B_{i,6}, B_{i,7}, B_{i,8}\} = \{t1_i, t2_i, tr_i, tf_i, \theta_i, \omega_i, k_i\}$ In the above equation, the leading edge turn on time is controlled by t1, and the turn-on rate is controlled by tr. The trailing edge turn-off time is controlled by t2, and the turn-off rate is controlled by tf. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $\omega + kT_D$. An example assignment of parameter values is $\omega = 1$, tr=tf=0.25, t1=tr/0.51, and t2=$T_D$-tr/9.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25 f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25 f_c$, and toward $2 f_c$. A key attribute of the exemplary wavelets (or e.g., those described in co-pending U.S. patent application Ser. No. 09/209,460) is that the parameters are chosen such that neither $f$ nor h in Equation 2 above has a DC component, yet $f$ and h exhibit the required wide relative bandwidth for UWB systems.

Similarly, as a result of $B > 0.25 f_c$, it should be noted that the matched filter output of the UWB signal is typically only a few cycles, or even a single cycle. For example, the parameter n in Equation 3 above may only take on low values (e.g., such as those described in co-pending U.S. patent application Ser. No. 09/209,460).

Figure 1B:
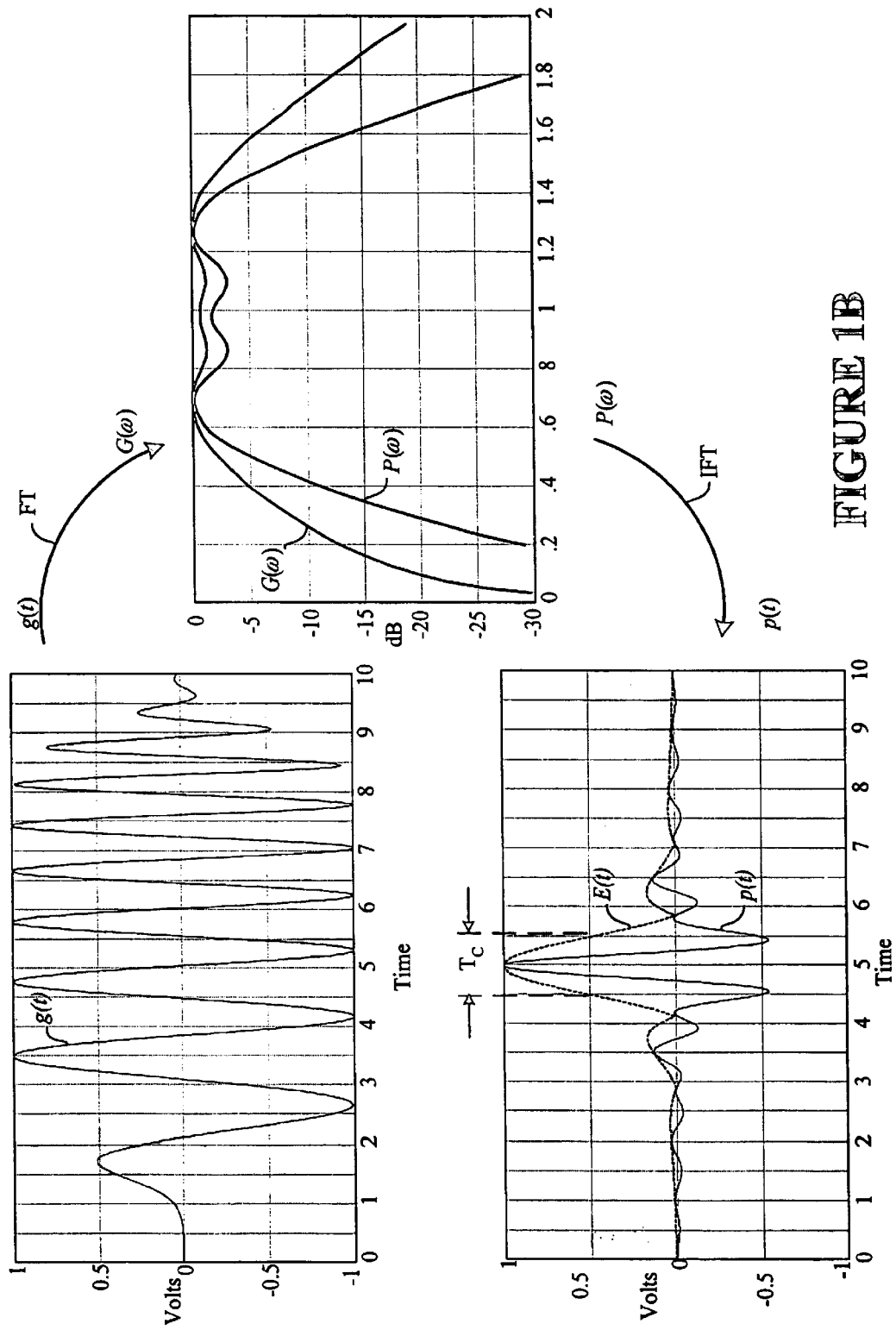
FIG. 1b is a diagram for illustrating the operation of the transceiver of FIG. 1a, according to the present invention.

The compressed (i.e., coherent matched filtered) pulse width of a UWB wavelet will now be defined with reference to FIG. 1b. In FIG. 1b, the time domain version of the wavelet thus represents g(t) and the Fourier transform (FT) version is represented by G($\omega$). Accordingly, the matched filter is represented as G*($\omega$), the complex conjugate, so that the output of the matched filter is P($\omega$)=G*($\omega$)·G($\omega$). The output of the matched filter in the time domain is seen by performing an inverse Fourier transform (IFT) on P($\omega$) so as to obtain p(t), the compressed or matched filtered pulse. The width of the compressed pulse p(t) is defined by $T_c$, which is the time between the points on the envelope of the compressed pulse E(t) that are 6 dB below the peak thereof, as shown in FIG. 1b. The envelope waveform E(t) may be determined by Equation 6 below.

$$E(t) = \sqrt{(p(t))^2 + (p^H(t))^2} \tag{6}$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 1a, the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming to signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window within the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICs) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may also divide the serial bit stream into subsets in order to send multiple bits per wavelet or per chipping code, and generate a plurality of control signals in order to affect any combination of the modulation schemes as described above (and/or as described in *Lathi*).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a prior knowledge of the user ID in order to make sense of the data For example, the ID may be used to apply a different amplitude signal (e.g., of amplitude "f") to a fast modulation control signal to be discussed with respect to FIG. 1c, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in *Lathi*). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 1C:
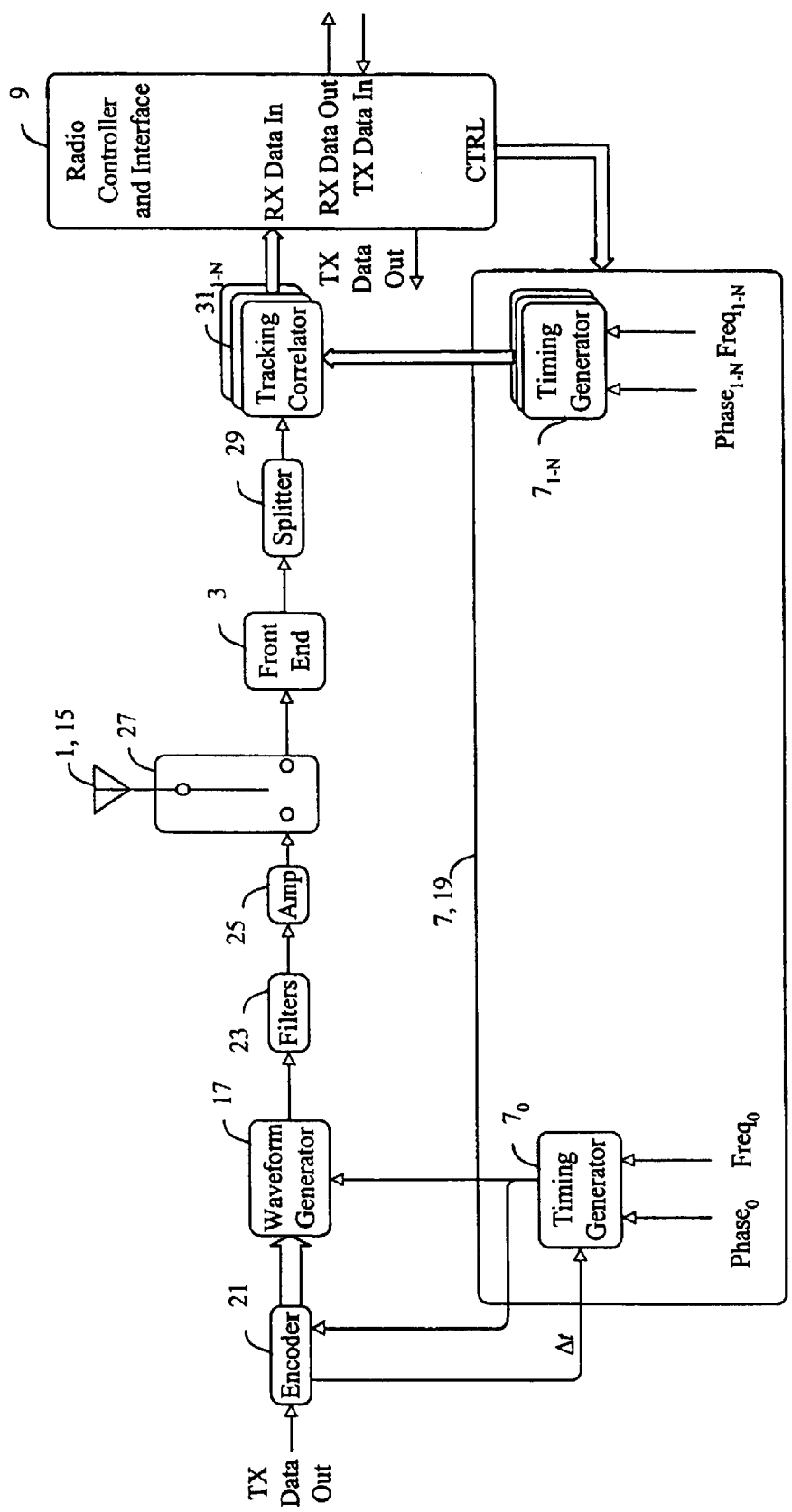
FIG. 1c is a block diagram of the transceiver of FIG. 1a, that manipulates a shape of UWB pulses, according to the present invention.

FIG. 1c is a block diagram of a transceiver embodiment of the present invention in which the modulation scheme employed is able to manipulate the shape and time of the UWB pulses. In FIG. 1c, when receiving energy through the antenna 1, 15 (e.g., corresponding antennas 1 and 15 of FIG. 1a) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$–$31_N$. Each of the tracking correlators $31_1$–$31_N$ receives a clock input signal from a respective timing generator $7_1$–$7_N$ of a timing generator module 7, 19, as shown in FIG. 1c.

The timing generators $7_1$–$7_N$, for example, receive a phase and frequency adjustment signal, as shown in FIG. 1c, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$–$31_N$ (corresponding to the UWB waveform correlator 5 of FIG. 1a), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and the match the timing of the signal produced at the receiver with the timing of the arriving signal. When the received signal and the locally generated signal coincide in time a with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$–$7_N$, so that each receiver can recover the signal delayed by different amounts, such as the delays caused by multipath (i.e., scattering along different paths via reflecting off of local objects).

A feature of the transceiver in FIG. 1c is that it includes a plurality of tracking correlators $31_1$–$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$–$31_N$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

Figure 2:
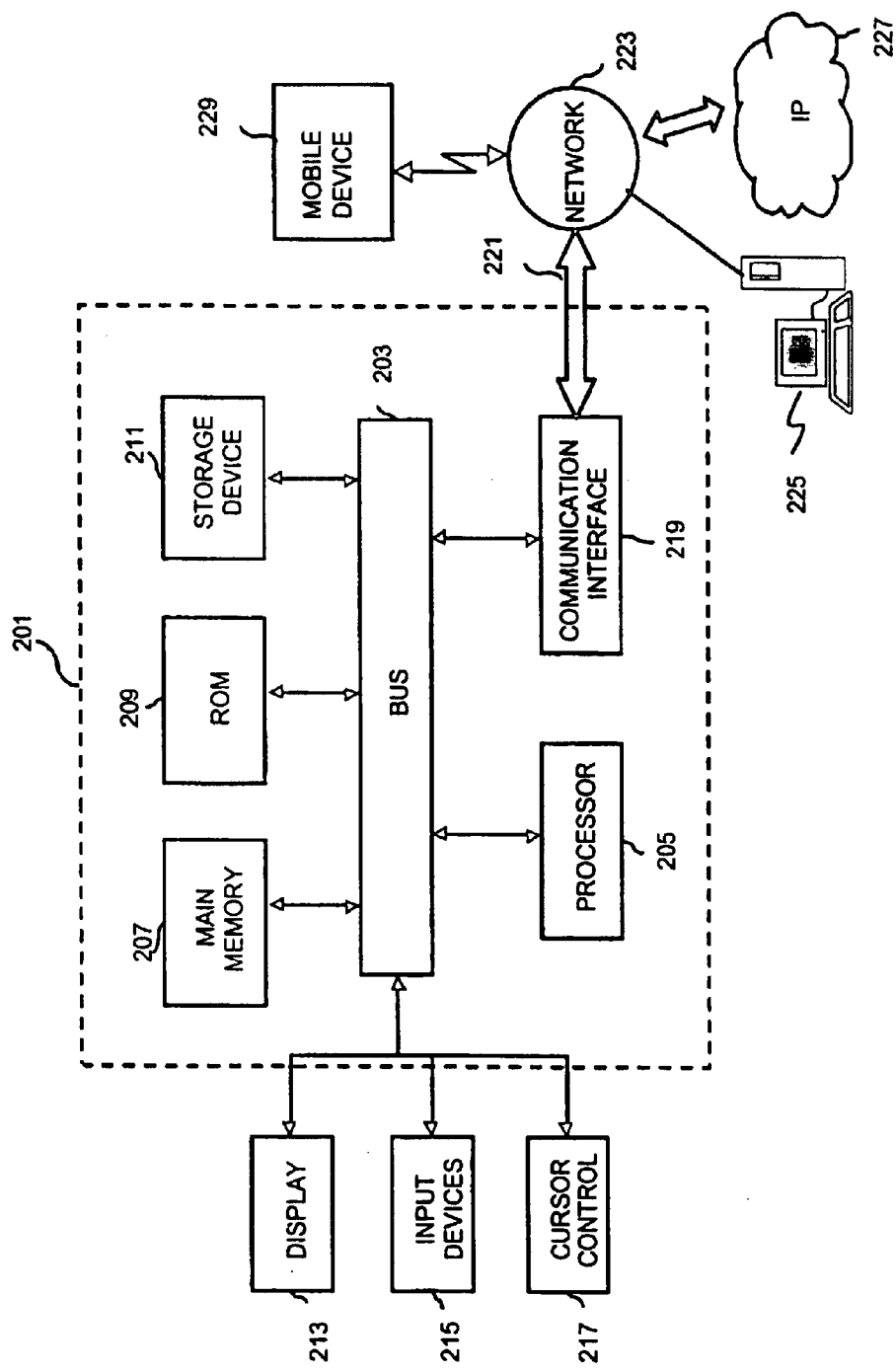
FIG. 2 illustrates a processor system upon which an embodiment according to the present invention may be implemented.

On the transmit portion of the transceiver shown in FIG. 2, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., $\Delta t$) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator $7_0$. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down without need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 1, 15, such that the amplifier 25 is not required. In this way, the entire radio can be integrated on a single monolithic integrated circuit.

Under certain operating conditions, the system can be operated without the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

FIG. 2 illustrates a processor system 201 upon which an embodiment according to the present invention may be implemented. The system 201 includes a bus 203 or other communication mechanism for communicating information, and a processor 205 coupled with the bus 203 for processing the information. The processor system 201 also includes a main memory 207, such as a random access memory (RAM) or other dynamic storage device (e.g., dynamic RAM (DRAM), static RAM (SRAM), synchronous DRAM (SDRAM), flash RAM), coupled to the bus 203 for storing information and instructions to be executed by the processor 205. In addition, a main memory 207 may be used for storing temporary variables or other intermediate information during execution of instructions to be executed by the processor 205. The system 201 further includes a read only memory (ROM) 209 or other static storage device (e.g., programmable ROM (PROM), erasable PROM (EPROM), and electrically erasable PROM (EEPROM)) coupled to the bus 203 for storing static information and instructions for the processor 205. A storage device 211, such as a magnetic disk or optical disc, is provided and coupled to the bus 203 for storing information and instructions.

The processor system 201 may also include special purpose logic devices (e.g., application specific integrated circuits (ASICs)) or configurable logic devices (e.g., simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 201 using an appropriate device bus (e.g., a small system interface (SCSI) bus, an enhanced integrated device electronics (DE) bus, or an ultra-direct memory access (DMA) bus). The system 201 may additionally include a compact disc reader, a compact disc reader-writer unit, or a compact disc juke box, each of which may be connected to the same device bus or another device bus.

The processor system 201 may be coupled via the bus 203 to a display 213, such as a cathode ray tube (CRT) or liquid crystal display (LCD) or the like, for displaying information to a system user. The display 213 may be controlled by a display or graphics card. The processor system 201 includes input devices, such as a keyboard or keypad 215, and a cursor control 217, for communicating information and command selections to the processor 205. The cursor control 217, for example, is a mouse, a trackball, or cursor direction keys for communicating direction information and command selections to the processor 205 and for controlling cursor movement on the display 213. In addition, a printer may provide printed listings of the data structures or any other data stored and/or generated by the processor system 201.

The processor system 201 performs a portion or all of the processing steps of the invention in response to the processor 205 executing one or more sequences of one or more instructions contained in a memory, such as the main memory 207. Such instructions may be read into the main memory 207 from another computer-readable medium, such as a storage device 211. One or more processors in a multi-processing arrangement may also be employed to execute the sequences of instructions contained in the main memory 207. In alternative embodiments, hard-wired circuitry may be used in place of or in combination with software instructions. Thus, embodiments are not limited to any specific combination of hardware circuitry and software.

As stated above, the processor system 201 includes at least one computer readable medium or memory programmed according to the teachings of the invention and for containing data structures, tables, records, or other data described herein. Stored on any one or on a combination of computer readable media, the present invention includes software for controlling the system 201, for driving a device or devices for implementing the invention, and for enabling the system 201 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 205 for execution. A computer readable medium may take many forms, including but not limited to, non-volatile media, volatile media, and transmission media. Non-volatile media includes, for example, optical, magnetic disks, and magneto-optical disks, such as the storage device 211. Volatile media includes dynamic memory, such as the main memory 207. Transmission media includes coaxial cables, copper wire and fiber optics, including the wires that comprise the bus 203. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 205 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 201 may receive the data on the telephone line and use an infrared transmitter to convert the data to an infrared signal. An infrared detector coupled to the bus 203 can receive the data carried in the infrared signal and place the data on the bus 203. The bus 203 carries the data to the main memory 207, from which the processor 205 retrieves and executes the instructions. The instructions received by the main memory 207 may optionally be stored on a storage device 211 either before or after execution by the processor 205.

The processor system 201 also includes a communication interface 219 coupled to the bus 203. The communications interface 219 provides a two-way UWB data communication coupling to a network link 221 that is connected to a communications network 223 such as a local network (LAN) or personal area network (PAN) 223. For example, the communication interface 219 may be a network interface card to attach to any packet switched UWB-enabled PAN 223. As another example, the communication interface 219 may be a UWB accessible asymmetrical digital subscriber line (ADSL) card, an integrated services digital network (ISDN) card, or a modem to provide a data communication connection to a corresponding type of communications line. The communications interface 219 may also include the hardware to provide a two-way wireless communications coupling other than a UWB coupling, or a hardwired coupling to the network link 221. Thus, the communications interface 219 may incorporate the UWB transceiver of FIG. 1a or 1c as part of a universal interface that includes hardwired and non-UWB wireless communications coupling to the network link 221.

The network link 221 typically provides data communication through one or more networks to other data devices. For example, the network link 221 may provide a connection through a LAN to a host computer 225 or to data equipment operated by a service provider, which provides data communication services through an IP (Internet Protocol) network 227. Moreover, the network link 221 may provide a connection through a PAN 223 to a mobile device 229 such as a personal digital assistant (PDA) laptop computer, or cellular telephone. The LAN/PAN communications network 223 and IP network 227 both use electrical, electromagnetic or optical signals that carry digital data streams. The signals through the various networks and the signals on the network link 221 and through the communication interface 219, which carry the digital data to and from the system 201, are exemplary forms of carrier waves transporting the information. The processor system 201 can transmit notifications and receive data, including program code, through the network(s), the network link 221 and the communication interface 219.

The present invention utilizes the benefits offered by ultra wide band spread spectrum technology. From an energy spreading perspective, or from a resolution perspective, bandwidth and center frequency can be treated independently. The name UWB, however, was coined by a DARPA study panel and though the term "relative bandwidth" does not appear in the name, a definition of UWB demands use of this term.

As recognized by the present inventors, the motivations for preferring definitions based on bandwidth relative to center frequency follow from three primary desirable features. The first is immunity to scintillation and multipath fading. The only way to prevent scintillation, speckle, and multipath fading is to have resolution that is approximately equal to the wavelength. The second is penetrating materials with high bandwidth signals. To communicate at the highest data rates through lossy media, or to do the highest resolution radar imaging through or within lossy media, requires both low frequencies (to penetrate) and wide bandwidths (to resolve),which when taken together require wide relative bandwidth. In this case, losses at higher frequencies are so great that these higher frequencies cannot be used. The definition of UWB is based on relative bandwidth because these benefits derive specifically from wide relative bandwidth and cannot be obtained with narrowband systems. A more complete discussion of the benefits of UWB communications signals can be found in application Ser. No. 09/078,616 referenced above and incorporated herein by reference.

If B is the bandwidth, $f_c$ is the center frequency, and $f_h$ and $f_l$ are the high and low frequency cutoffs (e.g. −6 dB from peak), then fractional bandwidth, $B_f$, is defined as $$B_f = \frac{B}{f_c} = \frac{(f_h - f_l)}{(f_h + f_l)/2}. \tag{7}$$

A UWB system is one that has a fractional bandwidth, $B_f$, in the range of 0.25 to 2.0 which means that a UWB system approximately matches its bandwidth to its center frequency, or said another way, matches resolution to wavelength.

The present invention provides a method for enabling device functions based on distance information. More specifically, the present invention provides a simplified method for enabling communications between a local wireless device and a remote wireless device based on the distance between the wireless devices. In order to provide such a distance based system that is practically usable, the wireless devices must be able to discriminate distances at fine intervals; or stated another way, the wireless device must have accurate range resolution.

The present inventors have recognized that the range resolution of a receiver is roughly inverse to the bandwidth of the transmit signal. Therefore, narrowband systems having a bandwidth of 1 MHZ, such as the Blue tooth technology previously discussed, have a range resolution of $$R_{res} = \frac{c}{BW} = \frac{3 \times 10^8 \text{ m/sec}}{1 \text{ MHz}} = 300 \text{ m} \tag{8}$$

Therefore, a device implementing Blue tooth protocol even if configured to determine distance, can discriminate between remote devices based on distance only if the devices are 300 meters apart. Similarly, wireless devices based on IEEE 802.11 A and B standards have a bandwidth of 20 MHZ and a range resolution of 15 meters or approximately 35 feet. This resolution does not provide the ability to discriminate between remote devices using distance information that is needed for short range exchanges that are typical of wireless hand held devices as described with respect to the electronic business card exchange and photo kiosk above.

The present inventors have recognized that using an ultra wide band system, range resolutions can be accomplished that have practical significance in distinguishing between remote wireless devices. For example, an ultra wide bandwidth system having 3 GHz of bandwidth has a range resolution of 1 meters. Even greater bandwidth systems can accomplish resolutions on the order of centimeters. Thus, as realized by the present inventors, a local UWB device can compute a unique distance to remote UWB devices as long as the actual distance from the local device to each remote device differs on the order of centimeters which is a common scenario for current uses of wireless devices such as PDAs.

Figure 3:
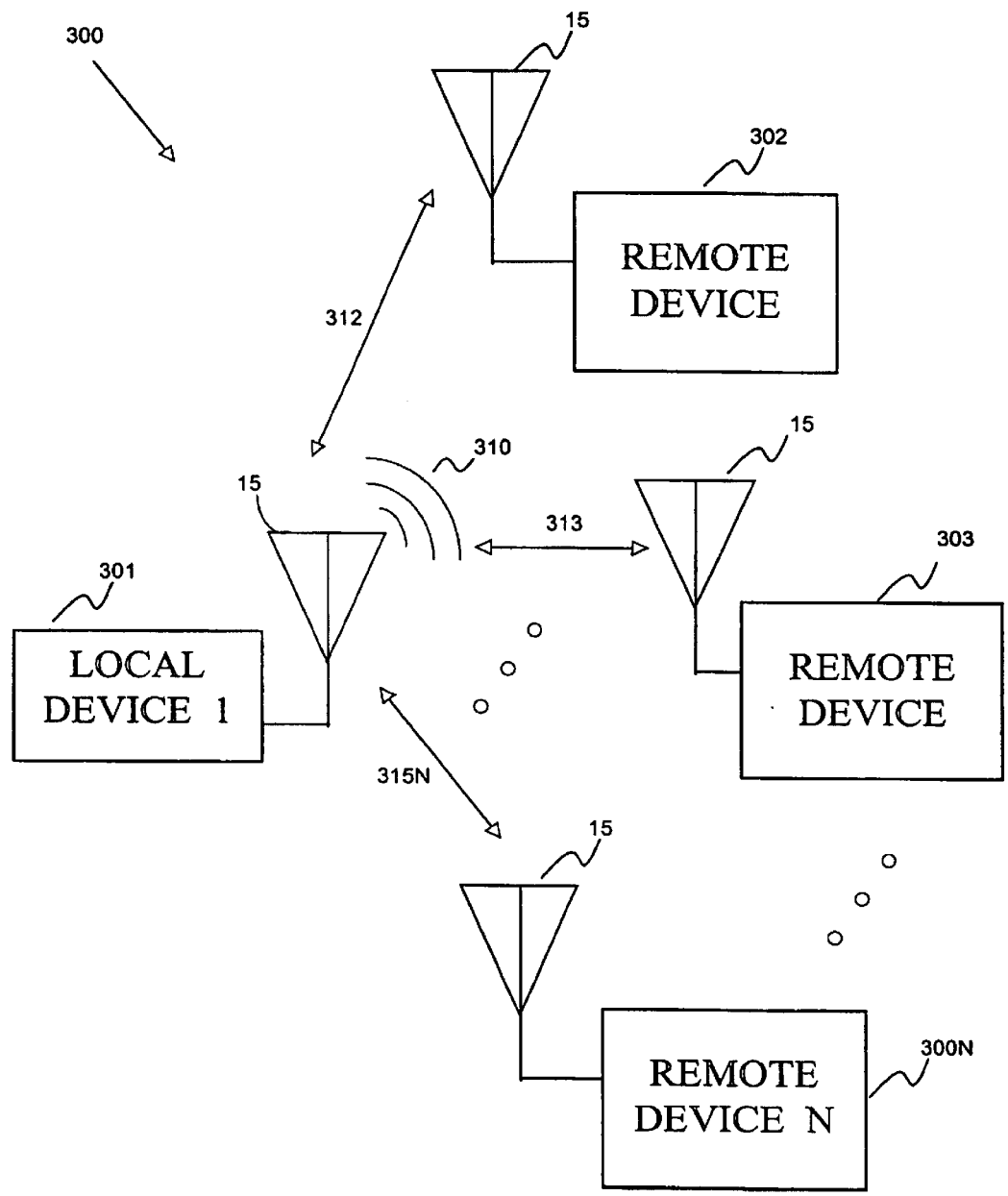
FIG. 3 is a wireless network in which a plurality of wireless devices may exchange information according to an embodiment of the present invention.

FIG. 3 discloses a wireless network 300 in which a plurality of wireless devices may exchange information. The wireless network 300 may be WPAN, WLAN or some other wireless network in which wireless devices make point to point connections, or point to multipoint connections on the shared channel of a piconet. The wireless network 300 includes a local device 301 linked to a first remote device 302, a second remote device 303 and N number of additional remote devices 300N via UWB links 312, 313, and 315N respectively. The UWB links are full duplex communications links that carry data, voice, video, or any other analog or digital information in accordance with the present invention. Each of the wireless devices 301 through 300N may be a mobile device such as a mobile telephone, a laptop computer or personal digital assistant (PDA), or a fixed structure device such as a retail store kiosk or some other fixed structure device for delivering information to other wireless devices. It is to be understood that device 301 is referred to as a "local device" and devices 302–400N are referred to as "remote devices" for purposes of description only, and that the present invention is not limited to an infrastructure system having an access point and may be implemented in an ad hoc system wherein any device in the network can act as a master and/or a slave device and no access point is needed.

Each of the of the devices 301 through 300N includes a processor system, such as the one described in FIG. 2, for inputting, storing, and processing data in accordance with the present invention. Therefore, local device 301 and each remote device 302–400N also includes a UWB transceiver, such as the transceiver described in FIG. 1a or 1c, that transmits and receives a UWB signal 310 via a UWB antenna such as antenna 1,15 also described in FIGS. 1a and 1c. The UWB antenna 1,15 is preferably an antenna as described in the patent application entitled ELECTRICALLY SMALL PLANAR UWB ANTENNA Ser. No. 09/633,815, or application Ser. No. 09/563,292, filed May 3, 2000 entitled PLANAR UWB ANTENNA WITH INTEGRATED TRANSMITTER AND RECEIVER CIRCUITS referenced above and incorporated herein by reference, but may be any known UWB antenna. The UWB signal 310 includes data for communicating with remote devices based on distance in accordance with the present invention.

Figure 4:
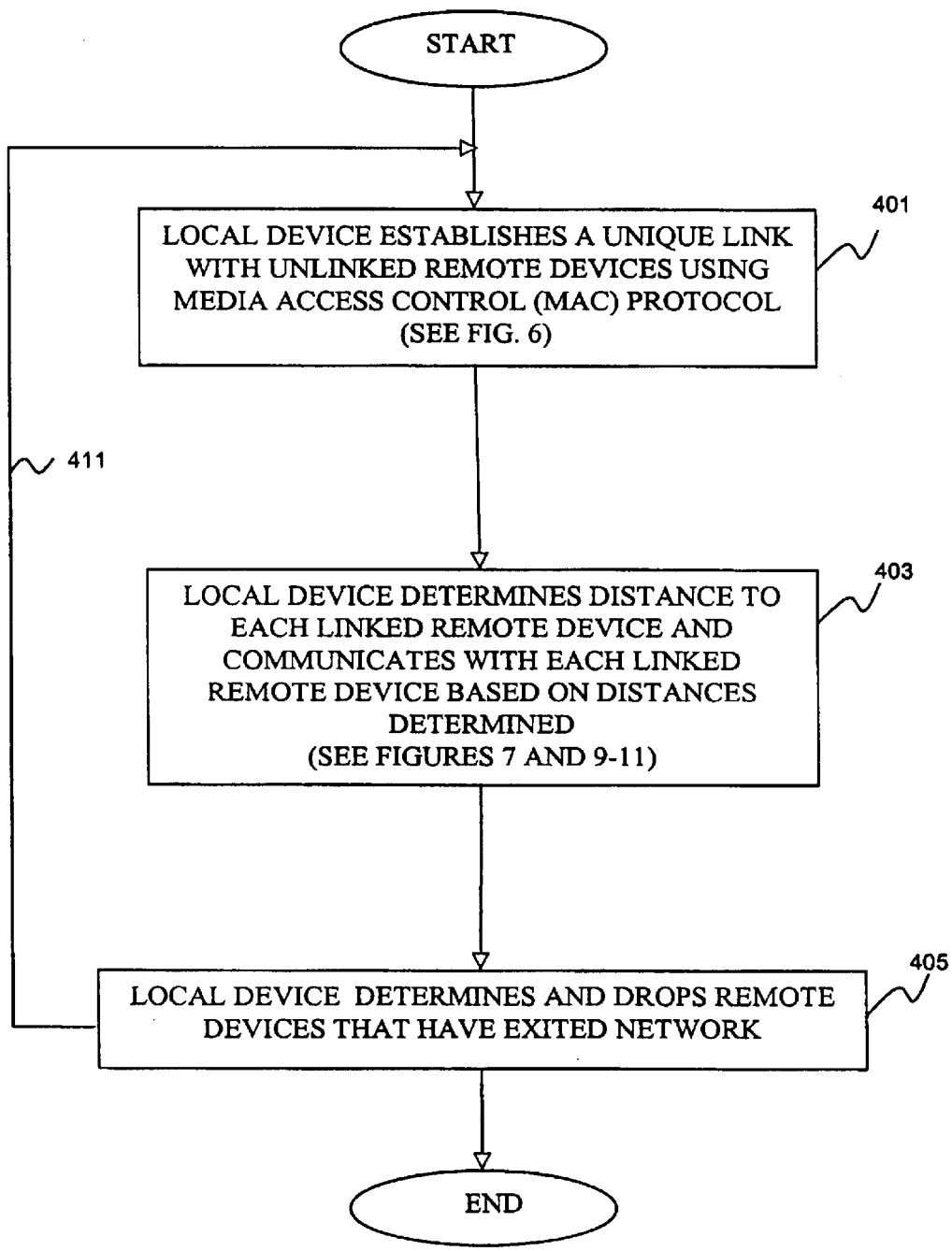
FIG. 4 is a general flow chart describing a process for communicating with remote wireless devices based on distance information in accordance with an embodiment of the present invention.

FIG. 4 is a general flow chart that describes a process for enabling device functions based on distance information in accordance with the present invention. The process starts when a device is turned on or enters the signal area of other wireless devices communicating on a wireless network. In step 401, the local device 301 establishes a link with each remote device 302 through 300N using a media access control (MAC) protocol. The MAC protocol is a protocol used on multiple access links to ensure that only one device has access to the shared link at any one time. The MAC protocol, in effect, allocates talking time to each device on the network. For example, the MAC protocol typically divides a single data frame into several time slots. Each device in the network transmits information in a particular time slot and listens in all other time slots of the frame. As each device has a fixed amount of bandwidth, that is, a fixed number of data bits which can be transmitter per second, under the MAC protocol, a fixed amount of data can be transmitted in the device's time slot. A common MAC protocol used for wireless bridges is the Carrier Sense Multiple Access with Collision Avoidance (CSMA/CA).

Examples of multiple access protocols may be found in the IEEE 802.11 standard, final draft approved Jun. 26, 1997, and the Blue tooth specification "Specification of the Blue Tooth System", V.1.OB, Dec. 1, 1999, core specification—Vol. 1, the entire contents of which are incorporated herein by reference. It is to be understood that the features and benefits of the present invention do not depend on a particular MAC protocol and any of the above named protocols or any other MAC protocol may be used to practice the present invention as will be understood to one of ordinary skill in the art. However, in this embodiment, the MAC protocol provides the capability for local device 301 to establish unique and independent UWB links 312, 313, and 315N with remote devices 302, 303, and 300N respectively as will be discussed with respect to the exemplary protocol of FIG. 5.

After unique links 312, 313, and 300N are established, the local device 301 determines a distance to each linked remote device and communicates with each linked remote device based on the distances determined as shown in step 403. In determining the distance, local device 301 exchanges information with remote devices 302, 303, and 300N via their respective unique links. Each distance determined by the local device 301 is associated with a remote device as will be discussed in describing FIG. 8. In communicating with the remote devices 302–300N based on the distances determined, the local device 301 makes use of the range resolution of the UWB signal as discussed above. Because the range resolution is on the order of centimeters, the probability of having remote devices at equal distances is very low and the local device 301 can differentiate between remote devices 302 through 300N based on the distance determined for each device. Thus, different communications can be made with each remote device depending on the distance to the remote devices.

For example, the local device may automatically enable data communications with devices that are located within a predefined range at any given time while all remote devices outside the predefined range will be blocked from data communications with the local device as will be described with respect to FIG. 6. Alternatively, the local device may enable data communications with devices that enter a predefined range and maintain data communications with such devices regardless of distance thereafter as will be described with respect to FIG. 8. Still alternatively, a local device may display a positional map of all users in relation to the local device so that the user of the local device may select those remote devices that the user wants to communicate with as will be discussed with respect to FIGS. 9 and 10.

As is understood by one of ordinary, in the art, while the above examples discuss "enabling" and "blocking" data communications to candidate remote devices based on distance to the remote devices, advantages of the present invention are obtained when any function of the local device 301 is performed using the distance information obtained in step 403. For example, the local device 301 may store data sent from remote devices within a predefined range while only displaying the information sent from remote devices outside that range. As another example, the local device 301 may notify the device user or automatically enter a sleep mode if no remote devices are within a predefined range. In another embodiment of the present invention, the local device 301 may enable different levels of communications with remote devices base on distance. As an example of this embodiment, local device 301 may enable communications for remote device 301 and 302 because both devices are within ten feet of the local device, but allow only remote device 302 to remotely edit a document on local device 301 because remote device 302 is within 3 feet of the local device and remote device 303 is not. From these examples it should be clear to one of ordinary skill in the art that virtually any function of the local device 301 may be accomplished based on distance information obtained in accordance with the present invention.

In step 405, the local device 301 periodically determines which linked remote devices have exited the network and drops those links. A remote device exits the network 300, for example, when power to the remote device is turned off or the remote device leaves the signal area of the local device. As used herein, the term "signal area" means that area in which the remote devices can receive, at a predetermined bit error rate, the transmitted signal from the local device and in which the local device can receive the transmit power of the remote device. A determination of whether a remote device has left the network may be made by the local device monitoring synchronization information of the remote devices, or by the local device receiving an exit message transmitted from the remote device prior to that device exiting the network. In addition, the local device 301 may monitor signal strength of remote devices and determine that a particular remote device has exited the network if the signal strength for that devices drops below a predetermined threshold which may be programmable by the user of the local device 301. In any situation where a remote device has exited the network 300, the MAC protocol terminates the unique link to that remote device.

After dropping links with remote devices that have exited the network, the local device executes a loop 407 in which the local device 301 establishes a unique link with new devices that have entered the network. A remote device enters the network 300, for example, when power to the remote device is on and the remote device is within the signal area of the local device 301. As indicated by the return loop 407 of FIG. 4, a unique link is established with these new unlinked devices using the MAC protocol as discussed with regard to step 401. According to one embodiment, the MAC protocol of the local device 301 periodically causes the local device to transmit a "join message" requesting new remote devices to join into the network and a unique link is established with those devices that reply to the join code. In another embodiment, the MAC protocol transmits a join message and establishes a new link only if prompted by a new remote device to do so. In yet another embodiment, the local device 301 keeps a count of the number of remote devices for which a unique link has been established, and the MAC protocol transmits a join message only if the count does not exceed a maximum number. The maximum number may be based on the bandwidth limitations of the local device 301 or programmable by the user of the local device 301.

In addition to joining new remote devices to the network, the loop 407 also serves to update distance information for linked remote devices. In this regard, the local device 301 repeatedly determines distance to each linked remote device 302–300N. In the case of new remote devices for which no distance information has been obtained, and for blocked remote devices, the distance determining signal is a simple request for a UWB reply signal so that distance can be updated. In the case of enabled remote devices, the distance determining signal may include a voice or data communication from the local device 301 to the enabled remote device as will be discussed. Moreover, the reply from the enabled device may be a communication from the remote device to the local device 301.

The process of enabling device functions and/or communicating with remote wireless devices ends when power to the local device 301 is turned off or the local device is outside the communicating area of the remote devices 302–300N. While "end" is shown as proceeding from step 405 in FIG. 4, it is to be understood that the end may occur at any point in the process of FIG. 4.

Figure 5:
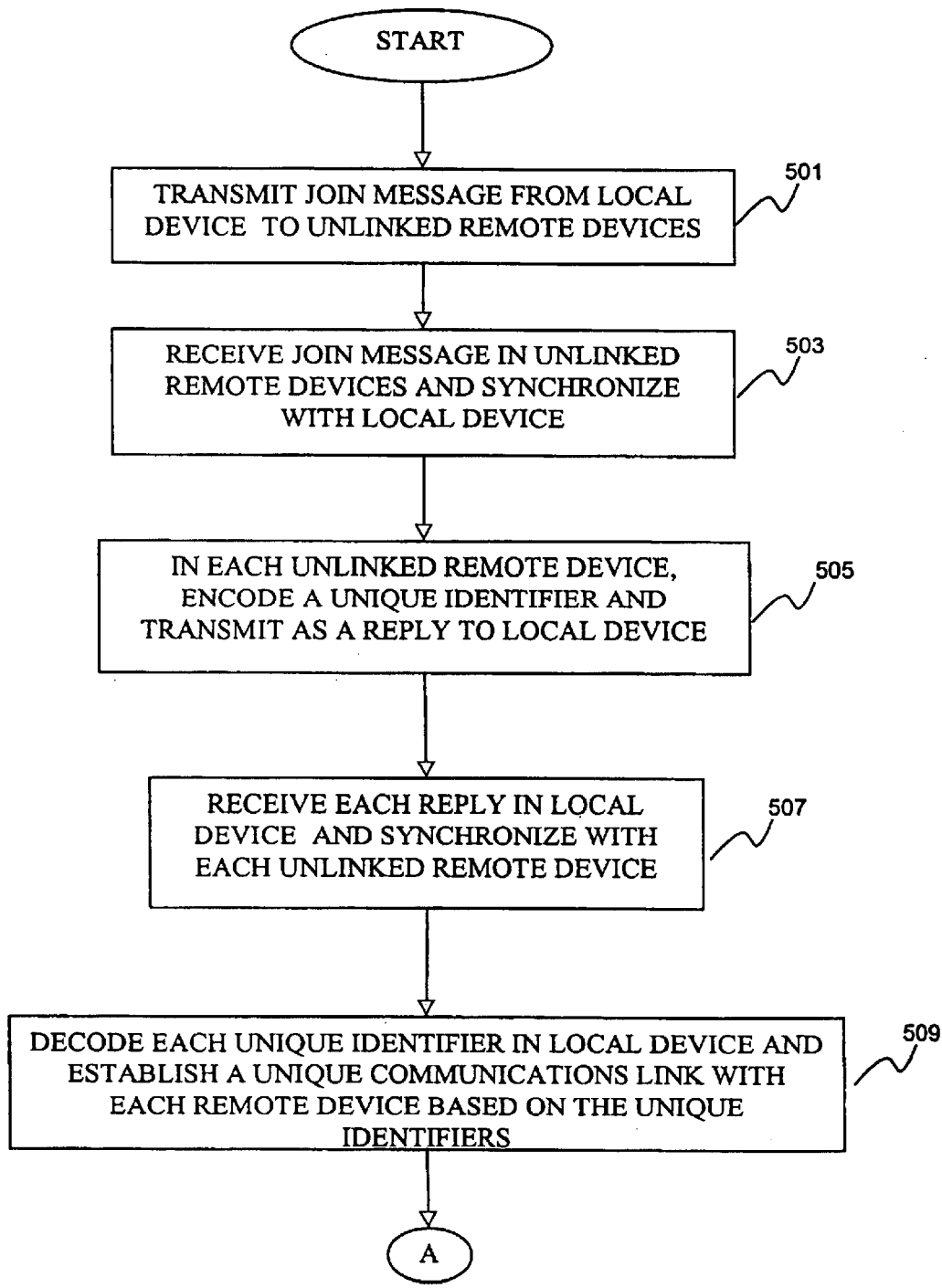
FIG. 5 is a flow chart describing the process of establishing a link with remote devices using a media access control (MAC) protocol in accordance with the present invention.

FIG. 5 is a flow chart describing the process whereby the local device 301 establishes unique communication links 312, 313, and 315N with remote devices 302, 303, and 300N respectively by using an exemplary MAC protocol in accordance with the present invention. In step 501, the local device 301 transmits a join message to all unlinked remote devices within a range of the transmission power of the local device 301. The join message may be a simple UWB signal that enables unlinked remote devices to synchronize to the local device 301, or may include information such as a device identifier, a device type identifier, a standard bit code, and/or any other information desired to be transmitted from local device 301 to the unlinked remote devices 302 through 300N. In the initial situation where the local device 301 has not established a unique link with any remote device, the local device 301 transmits a join message to all remote devices in the signal area. Where the local device 301 previously established links with remote devices, however, the join message is transmitted to new unlinked remote devices as discussed with respect to FIG. 4.

In step 503, each remote device that is within the signal area and is listening for the join message receives the join message and synchronizes with the local device 301. During synchronization, each of the remote devices 302–300N aligns in time a particular pulse sequence produced in the remote device with the pulse sequence of the join message sent from the local device 301. This synchronization of the remote devices 302 through 300N is preferably performed in accordance with the process described in any one of the patent applications entitled ULTRA WIDE BANDWIDTH SYSTEM AND METHOD FOR FAST SYNCHRONIZATION Ser. No. 09/685,195; ULTRA WIDE BANDWIDTH SYSTEM AND METHOD FOR FAST SYNCHRONIZATION USING HADAMMARD CODES; ULTRA WIDE BANDWIDTH SYSTEM AND METHOD FOR FAST SYNCHRONIZATION USING SUB CODE SPINS Ser. No. 09/684,401; ULTRA WIDE BANDWIDTH SYSTEM AND METHOD FOR FAST SYNCHRONIZATION USING MULTIPLE DETECTION ARMS Ser. No. 09/685,196 referenced above and incorporated herein, but may take place by any known method of synchronizing wireless devices.

Once the remote devices 302–300N are synchronized with the transmitted signal of the local device 301, each remote device transmits a reply to the join message as shown in step 505. Each reply message includes a unique identifier associated with the remote device from which the reply is transmitted. The unique identifier may be a device address stored in ROM 209, for example, or a unique delay time for the remote device as will be described below. Thus, in step 505, each of the remote devices 302 through 300N encodes its unique identifier information and attaches the information to a reply message to be transmitted back to the local device 301. The local device 301 then receives each reply and synchronizes with each remote device that sent a reply as seen in step 507.

In step 509, the local device 301 decodes each unique identifier and establishes unique communications links 312, 313, and 315N with remote devices 302, 303, and 300N respectively. In establishing the unique communications links, the local device 301 associates the unique identifier of each remote device with a communications link established by the synchronization process for the particular remote device. The unique identifier and associated links are then stored to the main memory 207 of the local device 301 for use in determining distance as will be described below. Each unique link 312, 313, and 315N is a low level communications link that is allocated a minimal amount of transmit time available to the local device 301. The amount of transmit time allocated may vary but is preferably an amount that is sufficient for the local device 301 to maintain awareness of the presence of the remote devices 302 through 300N and to determine and update distance to each linked remote device.

Figure 6:
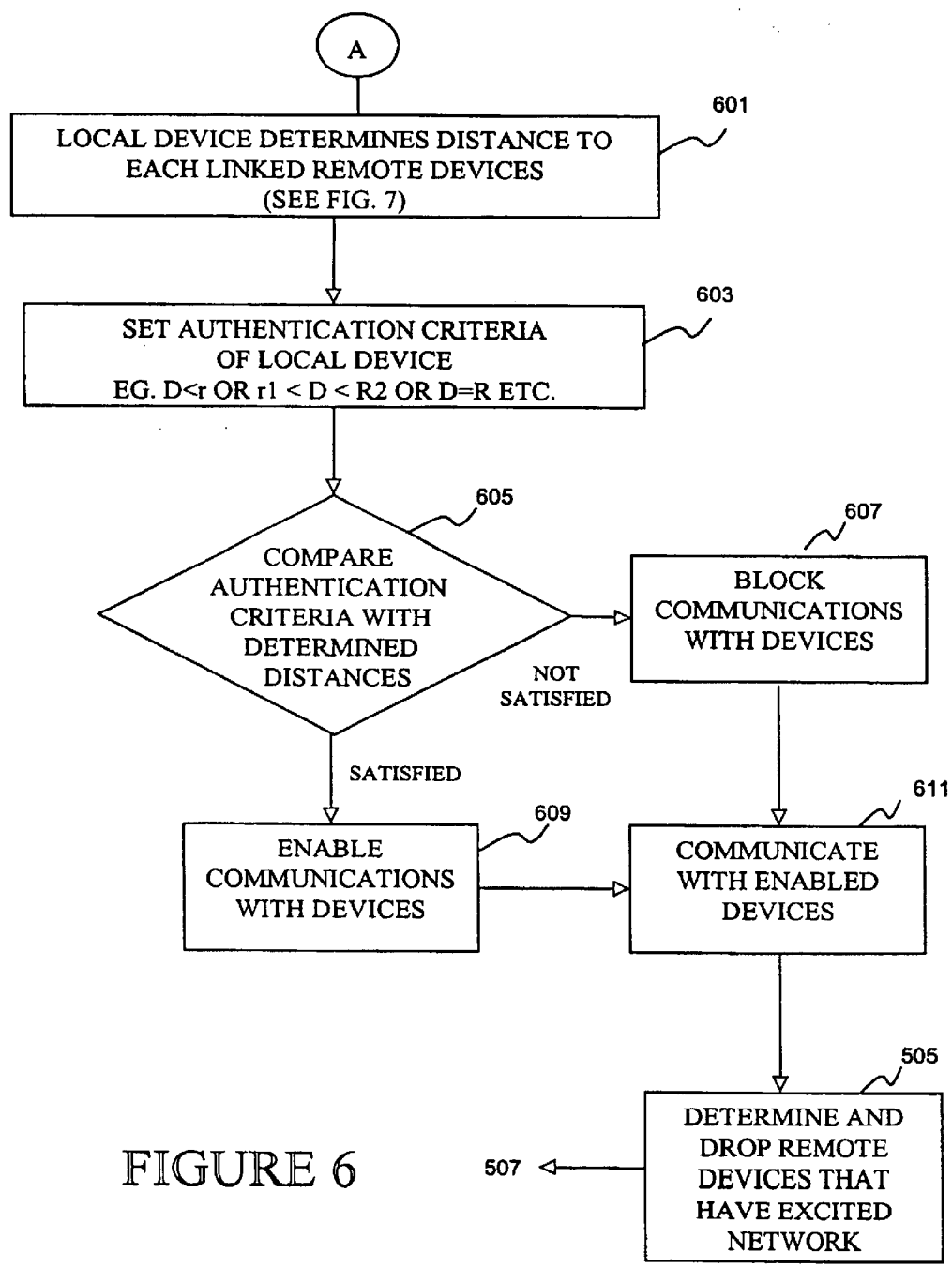
FIG. 6 is a flow chart describing a process for determining distance to linked remote devices and communicating with the remote devices based on distance in accordance with an embodiment of the present invention.

FIG. 6 is a flow chart describing a process for determining distance to linked remote devices and communicating with the remote devices based on the distance determined in accordance with one embodiment of the present invention. In step 601, the local device 301 determines a distance from the local device to each remote device and stores this information in main memory 207, for example, of the local device 301. How the distance determination is made will be discussed with respect to FIG. 7. After the distance to each remote device is determined, the local device 301 obtains an authentication criteria stored in the local device. The authentication criteria is a predefined range r or set of ranges r1 and r2, for example, which all remote device distances are compared to in order to determine if communications will be enabled for a particular remote device and/or what level of communications will be enabled for the device. For example, an authentication criteria may be that distance is less than the predefined range (D<r). Therefore, any remote device that is located at a distance away from the local device 301 will be authenticated and communications will be enabled for that device. Alternatively, the authentication criteria may be that distance is greater than a first predefined range, but less than a second predefined range (r1<D<r2), that distance is equal to a predefined range (D=r), or any other comparative operation.

The authentication criteria is preferably programmable by the user in which case the user inputs the authentication criteria into the main memory 207 of the local device 301 via the input device 215 for example, but may be set by the manufacturer of the local device in which case the range criteria is stored in the ROM 209 of the local device 301. In decision block 605, processor 205 of the local device 301 retrieves the determined distance for each remote device from memory and compares each distance with the authentication criteria also retrieved from memory. In this way, the local device determines whether each remote device satisfies the authentication criteria. If the results of a comparison indicate that a remote does not satisfy the authentication criteria, then communications with that remote device are blocked as seen in step 607. On the other hand, if the results of a comparison indicate that a remote device does satisfy the authentication criteria, then the local device 301 enables communications with the remote device as seen in step 609.

According to one embodiment of the present invention, communications are blocked and enabled at the applications software level and not the MAC level of the local device 301. That is, the MAC divides the transmit time of the local device equally among unique links that connect the local device 301 to the remote devices as if all remote devices are enabled. The applications software of the local device 301 then keeps track of the distance to each remote device and, in the case of transmitting a message, the applications software generates only messages that can be transmitted on those unique links that are enabled for communications. In this embodiment, the transmit time for blocked devices is "dead time" as no transmission from the local device 301 takes place during this time. In the case of receiving communications, the MAC also processes the received communications of each remote device as if all remote devices are enabled. The communications are then sent to the applications software which displays to the user only the communications received on unique links that have been enabled.

In a preferred embodiment, however, communications are blocked and enabled at the MAC level in the local device 301. In this embodiment, the local device 301 allocates a minimal amount of available transmit time to unique links associated with blocked remote devices, and a relatively large amount of transmit time to unique links associated with enabled remote devices. The minimal transmit time allocated to each unique link associated with a remote device that has not satisfied the authentication criteria is preferably an amount sufficient to transmit a simple distance determining message so that the local device 301 can update the distance information for blocked remote devices as discussed above. Similarly, in this embodiment, the MAC layer of the local device 301 does not process communications received from blocked remote devices. That is, for messages received from blocked remote devices, the message is detected and blocked at the MAC level and never processed and propagated up to the application software level of the local device 301. In this embodiment, the transmit time and processing time of the local device 301 is more efficiently utilized.

While steps 607 and 609 indicate that communications with remote devices are blocked and enabled based on a single authentication criteria, it is the be understood, that different types of communication with remote devices may be provided based on more than one criteria. For example, local device 301 may enable secured communications for remote devices within three feet of the local device 301 (D≦r1) and enable unsecured communications with remote devices between 3 feet and 10 feet of the local device 301 (r1<D<r2), while blocking communications to remote devices 10 or more feet from the local device 301 (D≧r).

After the local device 301 enables and blocks communications with each remote device as described above, the local device then communicates with enabled remote devices by transmitting and/or receiving communications such as text, video and voice on the unique links associated with the enabled remote devices as seen in step 611. In addition, the local device 301 drops unique links to remote devices that have exited the network in step 505 and executes loop 507 as discussed with respect to FIG. 5. According to the embodiment of FIG. 6, the local device 301 continually updates distance information for both enabled and blocked remote devices. Thus in executing loop 507, the local device 301 sends distance determining information to all linked remote devices in step 601. If the updated distance information of a previously blocked remote device now satisfies the authentication criteria, then that remote device will be enabled for communications. Similarly, if the updated distance information of a previously enabled remote device now does not satisfy the authentication criteria, then that remote device will be blocked from communications.

Revisiting the retail store kiosk situation discussed above, an example of the embodiment of the present invention shown in FIG. 6 is provided. In this example, the local device 301 of FIG. 3 is assumed to be a fixed structure kiosk, while remote devices 302–300N are assumed to be digital cameras held by consumers within the signal range of the kiosk. Moreover, it is assumed that the kiosk 301 is set with an authentication criteria such that remote devices that are located at a distance less than 2 foot from the local device will be enabled for communications (i.e., the criteria is D<r).

In this scenario, the kiosk 301 synchronizes and establishes a unique link with each digital camera using a MAC protocol as described in FIG. 5. In the first distance determination made by the kiosk 301, the cameras 302 and 303 are determined to be 1 foot and 1.5 feet respectively from the kiosk 301, while cameras 300N are determined to be greater than 10 feet from the kiosk 301. In this situation, the users of cameras 302 and 303 are holding their cameras close to the kiosk 301 to download photographs to the kiosk that will be printed while the user shops in the retail store. As cameras 302 and 303 satisfy the authentication criteria of the kiosk 301, the kiosk will enable the communications link 312 and 313 associated with these cameras respectively and block communications links 300N which do not satisfy the authentication criteria Therefore, the kiosk 301 accepts the data transmitted by the cameras 302 and 303.

In the embodiment of FIG. 6 where distance information is updated for all linked remote devices, on a subsequent distance determination made by the kiosk 301, cameras 302 and 303 are determined to be 11 and 11.5 feet respectively from the kiosk 301, while one of the 300N cameras is now 0.5 feet from the kiosk 301. The distance to all other 300N cameras are unchanged. In this situation, the user of the 300N camera at 0.5 feet is downloading photographs to the kiosk 301 for processing while the cameras 302 and 303 are exchanging photographs with one another away from the kiosk 301. In this situation the kiosk 301 will enable communications on the link associated with the camera 300N and accept its photographs, and block communications on links 312 and 313 associated with cameras 302 and 303. Thus, while the photographs exchanged by cameras 302 and 303 will be received by the kiosk 301 since these cameras are within signal range, the kiosk 301 will not process these photographs as a print request because the distance to the cameras does not satisfy the authentication criteria.

Thus, according to the embodiment of the present invention shown in FIG. 6, a local device automatically enables and blocks data communications with remote devices based on the remote device's distance from the local device thereby providing a dynamic network in which communications with remote devices may be received without the need for the user of the local device to select from among a list of remote devices based on private information about the remote device.

Figure 7:
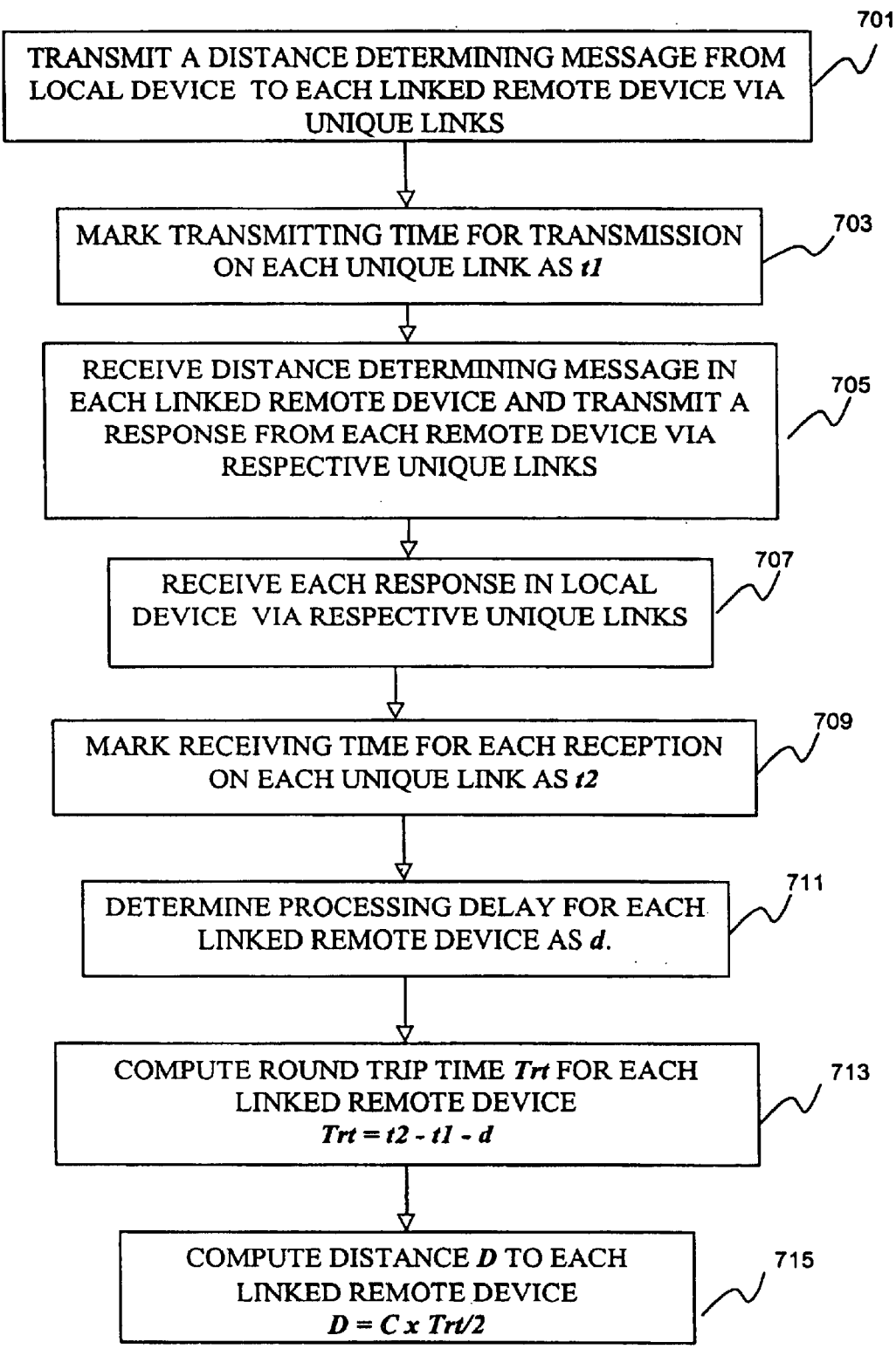
FIG. 7 is a flow chart describing the process of determining distance to a remote device in accordance with an embodiment of the present invention.

FIG. 7 describes the process of determining distance to each linked remote device in accordance with an embodiment of the present invention. In step 701, a distance determining message is generated in the local device 301 and transmitted to each linked remote device 302, 303, and 300N via the unique communication links 312, 313, and 315N. In an initial situation where the local device 301 has not enabled communications with any of the remote devices 302–300N either because no distance information is known or because all remote devices have been blocked, the distance determining message is a simple UWB signal the acts as a notification and/or request to each remote device that a distance determination is being made by the local device 301 as discussed above. Alternatively, where the local device 301 knows distance information for the remote devices and has enabled communications for certain remote devices, the distance determining message may be a communication to the enabled device as discussed above.

For each distance determining message sent on each unique communications link 302 through 300N, the local device 301 marks a time t1 as the transmitting time that the message was sent out for the particular communications link as shown in step 703. Transmit time t1 is obtained by a system clock in the processor system 201 of the local device 301. Each transmit time t1 is associated with one of the unique identifiers stored in step 609 based on the unique link over which the distance determining massage was transmitted. The transmit times and associated identifiers are then stored in the main memory 207 of local device 301 so that the transmit times may be retrieved to determine the distance to each remote device.

In step 705, the linked remote devices 301, 302, and 300N receive the distance determining message via a respective unique link and transmit a response to the local device 301 over the same unique link. As with the distance determining message transmitted in step 701, the response message from the remote devices may include a communication if the link responded on is an enabled link. In step 707, the local device 301 receives responses sent from the linked remote devices via respective unique links and marks a receive time t2 for each response received as seen in step 709. As with the transmit times t1, each receive time t2 is associated with the unique identifier of a respective link and stored in main memory 207 for use in calculating a distance from the local device 201 to each remote device 202 through 200N.

Before computing a distance to each linked remote device, the local device 201 first determines a processing delay d for each linked remote device as seen in step 711. Processing delay d is the time delay between the remote device receiving the distance determining message and transmitting a response and includes at least the amount of time necessary for the remote device to process the distance determining message and form a response. According to one embodiment, the processing delay d is determined by retrieving the delay from the memory of the local device 201. In this embodiment, the local device 201 receives information from each remote device about the radio type of the remote device, as part of the reply and/or response received from the remote devices as discussed with respect to steps 507 and 707 respectively. Alternatively, the type information may be received as part of an independent signal sent by the remote devices. With the remote device type known, the local device 301 then refers to a look up table (LUT) stored in memory 207 or ROM 209 to determine a predefined processing delay for the radio type.

In an alternative embodiment, the processing delay d of each remote device 302 through 300N may be transmitted to the local device 301 as part of the reply, the response, or some independent signal. In this embodiment, the processing delay d may be the inherent delay of the remote device plus some arbitrary delay time that gives the remote device a unique delay time the may be used as the unique identifier for the remote device as discussed with respect to step 505 of FIG. 5 above. The processing delay d is then stored in main memory 207 for use in establishing unique communications links with remote devices and in determining the distance to remote devices.

In step 713, the local device 301 calculates the round trip time Trt for each linked remote device 302 through 200N. In this step, the local device 301 retrieves the transmitting time t1, receiving time t2, and processing delay time d of a particular unique link to a remote device from main memory 207 and ROM 209 as discussed above. The processor 205 of the local device 301 then computes the total round trip time according to the following formula:

$$Trt = t2 - t1 - d \qquad (9)$$

Thus, the round trip time is the time that the distance determining signal and the response signal travel through the wireless medium and is different for each remote device. Each round trip time Trt is stored to main memory 207 where the processor 205 of the local device 301 retrieves the Tris and computes the distance D to each remote device according to the following formula:

$$D = c \times \frac{Trt}{2} \qquad (10)$$

where c is the speed of light which is the speed at which an RF signal travels through the wireless medium. The distance D for each remote device 302 through 300N is then associated with the unique identifier of the unique communications link over which the distance was determined and is stored in main memory 207 so that systems software of the local device 301 may retrieve the distance information to enable or block communications with the remote devices based on their distance from the local device 301.

Figure 8:
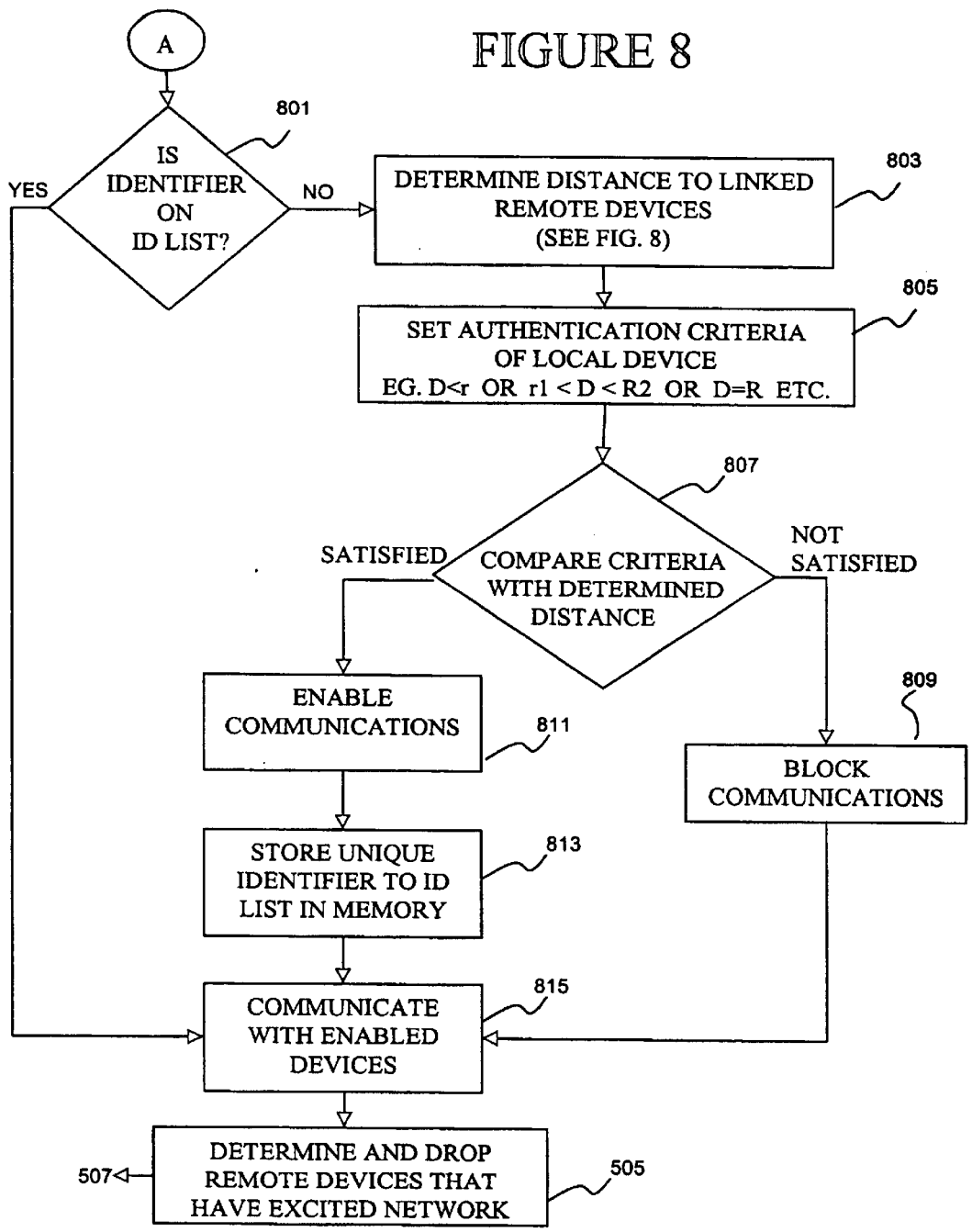
FIG. 8 describes process wherein a local device remembers enabled remote devices and communicates with remote devices based on distance in accordance with an embodiment of the present invention.

FIG. 8 describes an alternative embodiment of the present invention wherein the local device 301 stores the unique identifier of authenticated remote devices to an ID list so that communications can remain enabled without regard to distance after authentication. After the local device 301 establishes a unique link with remote devices 302–300N, decision block 801 determines whether a unique identifier received as part of a communication is on the ID list stored in the main memory 207, for example, of the local device 301. If the identifier is on the ID list, then communications have been enabled for the remote device associated with the communication and the communication is processed by the local device 301 as indicated by step 815. On the other hand, if the identifier is not on the ID list stored in memory, the local device 301 determines the distance to the remote device that sent the communication as seen in step 805. In the initial situation where no distance information is known to the local device 301, the "no" path of decision block 801 will always be taken because the unique identifier of a remote device cannot be placed on the ID list stored in memory until distance information is known as will be described below.

In step 803, the local device 301 determines a distance from the local device to each remote device and stores this information in main memory 207 as discussed with respect to FIG. 7 above. The local device 301 then sets the authentication criteria in step 805. As with the embodiment of FIG. 6, the authentication criteria is preferably programmable by the user in which case the user inputs the authentication range into the main memory 207 of the local device 201 via the input device 215 for example, but may be set by the manufacturer of the device in which case the authentication range is stored in the ROM 209 of the local device 201. In step 807 the local device compares the authentication criteria with determined distances of remote devices as also discussed in FIG. 6. In making this comparison, the processor 205 determines whether the distance for a particular remote device is less than, equal, or greater than the authentication criteria, for example. If the results of a comparison for a particular remote device indicate that the remote device does not satisfy the authentication criteria, then communications are blocked with that remote device as seen in step 809. On the other hand, if the results of a comparison for a particular remote device indicate that the remote device does satisfy the authentication criteria, then communications are enabled for that remote device as seen in step 811.

In addition to enabling communications with the remote devices that satisfy the authentication criteria, the local device 301 stores the unique identifier of the enabled remote device to an ID list stored in the main memory 207 of the local device 301 as seen in step 813. The purpose of storing the unique identifier to an ID list is so that the local device does not have to determine distance to remote devices in future operations.

After the local device 301 enables and blocks communications with each remote device as described above, the local device then communicates with enabled remote devices by transmitting and receiving communications such as text, video and voice on the unique links associated with the enabled remote devices as seen in step 815. In addition, the local device 301 drops unique links to remote devices that have exited the network in step 505 and executes loop 507 as discussed with respect to FIG. 5. According to the embodiment of FIG. 8, the local device 301 continually updates distance information for only blocked remote devices. Thus in executing loop 507, the local device 301 sends distance determining information to linked remote devices in step 803 only if the unique identifier of those remote devices is not stored in the memory of the local device as determined in step 801. If the updated distance information of a previously blocked remote device now satisfies the authentication criteria, then that remote device will be enabled for communications. However, as distance information is not updated for previously enabled remote devices, these devices remain enabled regardless of their distance after authentication:

Revisiting the business card exchange situation discussed above, an example of the embodiment of the present invention shown in FIG. 8 is provided. In this example, the local device 301 of FIG. 3 is assumed to be a local PDA held by a first user, while remote devices 302–300N are assumed to be remote PDAs held by other users within the signal range of the local PDA. Moreover, it is assumed that the local PDA 301 is set with an authentication criteria such that remote PDAs that enter within 1 foot of the local device will be enabled for communications (i.e., the criteria is D<r) regardless of the distance thereafter.

In this scenario, the local PDA 301 synchronizes and establishes a unique link with each digital camera using a MAC protocol as described in FIG. 5. In the initial situation where no distance information is known to the local PDA 301, the local PDA 301 determines that none of the unique identifiers received during the establishment of unique links is on the ID list in step 801 and therefore determines the distance to all linked devices. In the first distance determination made by the local PDA 301, the remote PDAs 302 and 303 are determined to be 0.5 and 0.7 feet from the local PDA 301 respectively, while remote PDAs 300N are determined to be at various distances greater than 1 foot from the kiosk 301. In this situation, the users of remote PDAs 302 and 303 are holding their PDA close to the local PDA 301 to register with the local PDA 301 for subsequently sending a business card, while remote PDAs 300N exchanging electronic business cards with each other in different areas of the conference room. As remote PDAs 302 and 303 satisfy the authentication criteria of the local PDA 301, the local PDA 301 will enable communications links 312 and 313 and store the unique identifier associated with remote devices 302 and 303 to the ID list. Links 300N are blocked by the local PDA 301 as the devices associated with these links do not satisfy the authentication criteria.

In the embodiment of FIG. 6 where distance information is updated only for blocked remote devices, distance determinations made by the local PDA 301 will only be made for remote PDAs 300N and any communications received on links 312 and 313 will be processed by local PDA 301 without a distance determination being made. Thus, on a subsequent processing sequence of the local PDA 301, the local PDA 301 receives an electronic business card from the intended remote PDAs 302 and 303, as well as the electronic business cards from the unintended PDAs 300N that exchanging card elsewhere in the conference room. As PDAs 302 and 303 are on the ID list, the local PDA 301 processes the business cards from these devices and displays them to the user of local device 301, for example. This occurs even if the remote PDAs 302 and 303 are now located greater than 1 foot from the local PDA 301. In short, the local PDA does not care what the distance to remote PDAs 302 and 303 is after these devices are registered.

On the other hand, as the local PDA 301 determines that the unique identifiers associated with the remote PDAs 300N are not on the ID list, the local PDA 301 does not process the business cards received from these devices, but rather determines the distance to these devices to see if they are now within the authentication range. If any PDA of the remote PDAs 300N are now within the authentication range, then this device is now enabled for communications and added to the ID list, and all subsequent communication with the device are made without determining distance to the PDA.

Thus, according to the embodiment of the present invention shown in FIG. 8, a local device automatically enables communications with remote devices that at any time enter within the authentication range of the local thereby providing a dynamic network in which communications with remote devices may be received without the need for the user of the local device to select from among a list of remote devices based on private information about the remote device.

Figure 9:
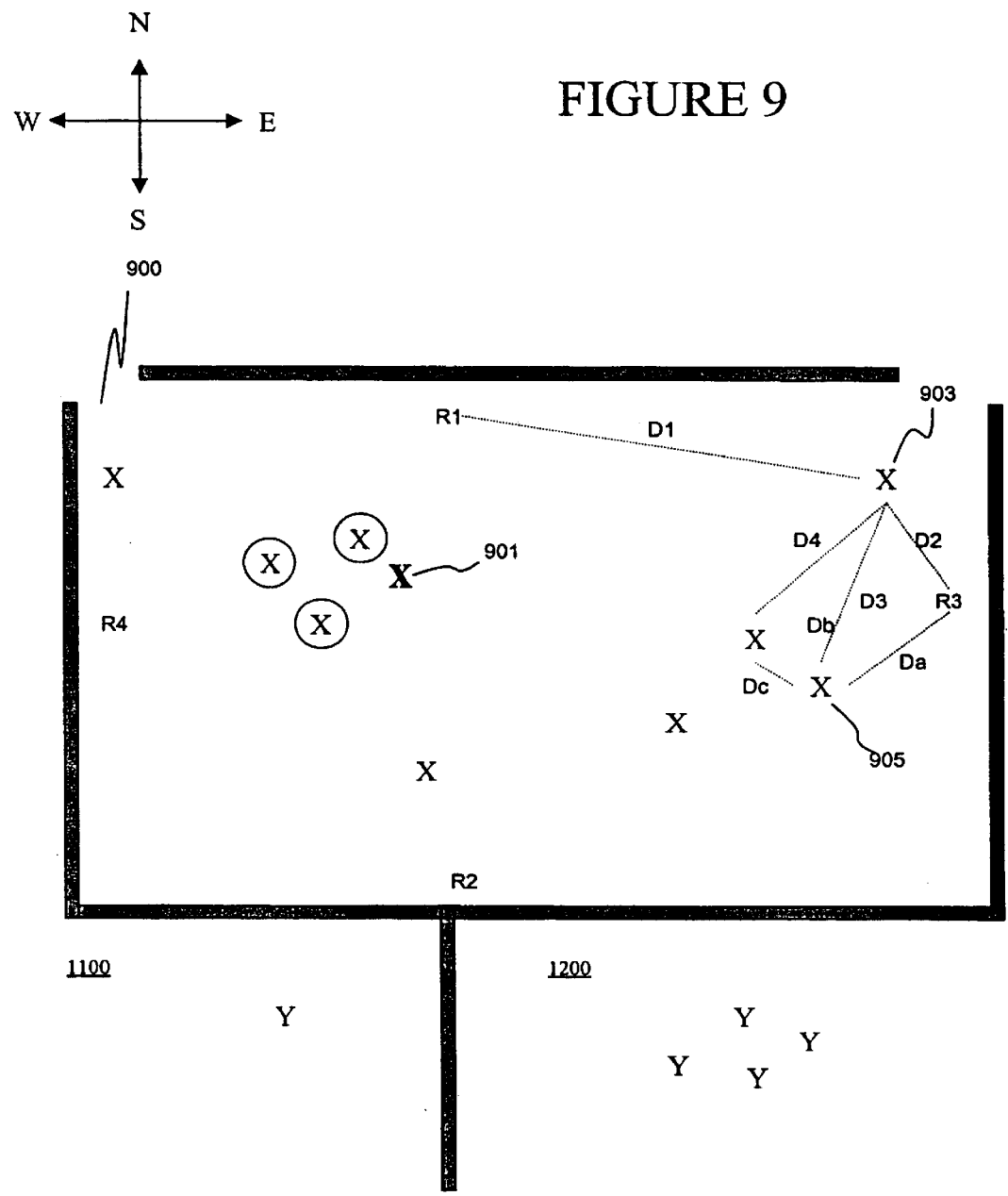
FIG. 9 illustrates a typical conference room in which a plurality of remote devices communicate based on distance and positioned information in accordance with an embodiment of the present invention.

According to yet another embodiment of the present invention, distance information is used to provide a positional map of remote devices from which the user of the local device can select the remote devices for which communications links will be enabled. FIG. 9 shows a typical conference room 900 located adjacent to rooms 1200 and 1300. The conference room 900 has ten mobile wireless devices each of which is represented by an "X", and four fixed reference devices represented by an "R". A local mobile device within conference room 900 is represented as a bold faced X 901 while all remote mobile devices within conference room 900 are represented as a non-bolded X and mobile devices within adjacent rooms 1000 and 1100 are represented by a "Y". The reference devices R1, R2, R3, and R4 are in fixed positions to provide a known reference point from which the position of each mobile device X and Y is measured. The reference devices may be fixed structure devices or mobile devices that remain stationary in conference room 900 during conferences.

As with the network of FIG. 3, while device 901 is referred to as a "local device" and all other devices of FIG. 9 are referred to as "remote devices", this nomenclature is for purposes of description only and it is to be understood that the embodiment shown in FIG. 9 is not limited to an access point system and may be implemented in an ad hoc system wherein any device in the network can act as a master and/or a slave device. Also as with the devices of FIG. 3, local device 901 and each remote device X, Y and R includes a processor system, such as the one described in FIG. 2, for inputting, storing, and processing data in accordance with the present invention, and a UWB transceiver that transmits and receives a UWB signal which includes data for communicating with remote devices based on distance in accordance with the present invention. Additionally, each wireless device shown in FIG. 9 preferably includes a compass used for orienting the display 213 of the local device 901. In this regard, the reference devices R1, R2, R3, and R4 are preferably located due north, south east and west and west of a center point of the conference room 900, as seen by the directional arrows of FIG. 9, so that the display 213 of the local device 901 can be oriented in accordance with the direction in which the user of the local device is facing as will be discussed.

According to the embodiment related to FIG. 9, the display 213 of the processor system 201 of local device 901 displays a graphical map of the position of each remote device in conference room 900 from which the user of the local device may choose remote devices to enable communications with. Thus, the display 213 appears as a top view of the conference room 900 with each device physically located in the conference room having a corresponding position on the display 213 of the local device 901. In making a selection, the user of local device 901 looks at the display 213 and associates the devices on the display with a remote device visually verified by the local user. In a preferred embodiment, the reference marker that the local user is facing always appears at the top of the display 213 so that the local user can easily associate the physical location of a remote device and user with the corresponding screen location.

Figure 10:
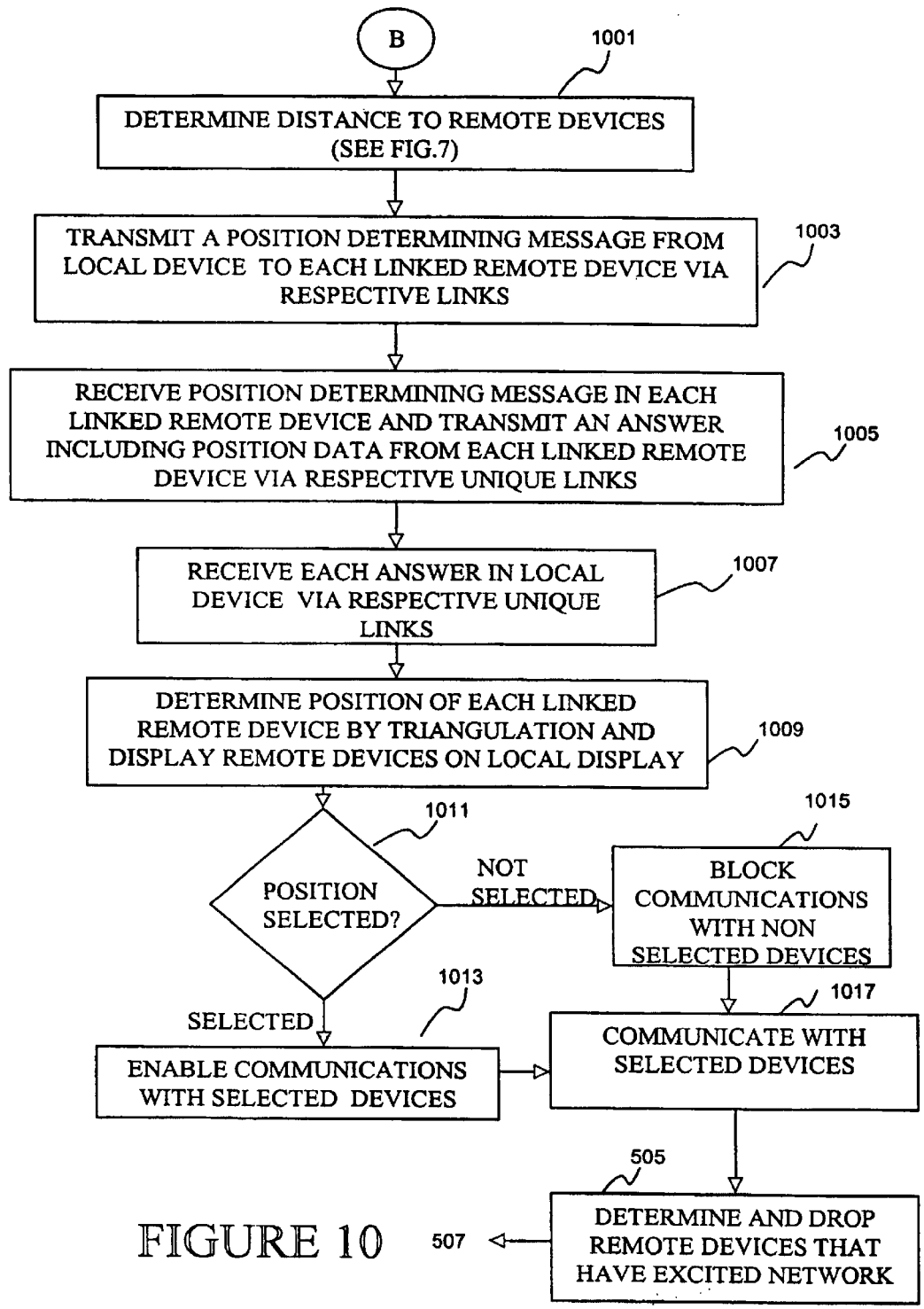
FIG. 10 shows a process for enabling and disabling communications with remote devices based on selections made on a positional map obtained from distance information in accordance with the present invention.

FIG. 10 shows a process for enabling and disabling communication with remote devices based on selections made on a positional map obtained from distance information in accordance with the present invention. In this embodiment, the local device 901 establishes a unique link with each remote device, including mobile devices X, reference devices R1–R4, and mobile devices Y as described in FIG. 5, and determines distance to each remote device as shown in step 1001 and described in FIG. 7. In step 1003, the local device 901 transmits a position determining message to all linked remote devices X, R, and Y via the unique links established with each device. The position determining message may be a simple UWB signal that indicates that the local device 901 is requesting the data necessary to determine position information from each linked remote device. Alternatively, as with the distance determining message discussed above, the position determining message may be included in a communication to devices previously enabled by the local device 901.

In step 1005, each of the linked remote devices receives the position determining message and transmits an answer to the local device 901 via a respective communication link. In this step, each of the linked remote devices encodes position information obtained by the remote device and includes the position information in the answer transmitted. The position information includes the distance from the answering remote device to each other remote device X, R, and Y. For example, referring to FIG. 9, mobile device 903 will have continually updated information of the distance from itself to reference device R1, to reference device R3, to device 905, as indicated by dashed lines D1–D4 of FIG. 9, as well as information of the distance to each other device. Similarly, device 905 will have a continually updated database of the distance from itself to each other as exemplified by dashed lines Da–Dc of FIG. 9.

In step 1005 of FIG. 10, remote devices 903 and 905, as well as all other remote devices X, Y, and R encode this position information and transmit it as part of the answer to local device 901. According to one embodiment, the position information may include distance from the answering remote device to a limited number of remote devices when the number of remote devices in the listening range of the local device 901 is large. Moreover, remote devices may cooperate with one another to ensure that duplicate distance information such as distance D3 and Db is not transmitted to local device 901. These features reduce the amount of data to be processed by processor 205 of the local device 901 and therefore increases the speed at which the local device 901 can display positional updates on the display 213.

In addition to this positional information, the answer of the reference devices R1 through R4 includes data identifying the remote devices as reference devices and includes the unique position of the reference device. For example, reference device R1 of FIG. 9 would encode data indicating to the local device 901 that R1 is a remote device and is positioned on the north wall of the conference room 900. According to one embodiment, this information is input into the reference devices R1–R4 by a user when the conference room 900 is set up for positional capabilities. Thus, reference devices R1 through R4 may be mobile wireless devices normally used for communicating with other mobile wireless devices but set up by a user to serve as a reference device.

In step 1007, the local device 901 receives the answer from each remote device including the reference devices R1–R4, devices X and devices Y, and decodes the positional information of each remote device and stores the distances of the positional information in main memory 207. From the stored distance information, processor 205 of device 901 determines the position of each device using a triangulation process as seen in step 1009. All positions are then displayed on the display 213 of the local device 901 so that the user of the local device can associate each remote device on the screen with a remote device physically located in the conference room 900. According to a preferred embodiment, the local device 901 refers to an internal compass to determine which direction the local device is facing and matches this information with the position information received from the reference devices R1–R4 to ensure that the display 313 of the local device is properly oriented. For example, if the local user is facing north, the local device 901 knows from the information received in step 1007 that the reference marker R1 is on the north wall and orients the positional map such that reference device R1 is at the top of the display 313. If the user then faces east, then the internal compass of the local device indicates that a change in direction has occurred and the local device orients the positional map such that R3 is at the top of the display 313. In this way, the remote devices X and R on the display 313 are always shown as in front of or behind the local device 901 as these remote devices are positioned vis a vis the local user in the real space of conference room 900.

According to another embodiment, the local device 901 uses triangulation information to determine which remote devices are outside a boundary formed by reference devices R1–R4 and uses this information to display only those devices within the boundary. A variety of triangulation techniques may be used such as those described in Danon, R. Triangulation from a Known Point", Blue Moon Books, 1995, ISBM, 0929654935, the entire contents of which being incorporated herein by reference. Thus, according to this embodiment, the local device 901, identifies the remote devices Y located in rooms 1000 and 1100 of FIG. 9 and does not display these devices on the display 213 of the local device 901.

With the remote devices located within conference room 900 displayed on the display 213 of the local device 901, the user of local device 901 enables communications with a remote device viewed in physical space of the conference room 900 by selecting a corresponding position on the display, as shown by decision block 1011. According to one embodiment, the display 213 has touch screen capabilities that allow the user to select a remote device by contacting the display with a pointing device, for example. If the user of the local device 901 selects a device on the display of the local device, then the local device 901 enables communications with that device as shown in step 1013. If the user does not select a particular device on the display screen, the communications link associated with the unselected device is blocked from data communications as in step 1015.

After the local device 901 enables and blocks communications with each remote device as described above, the local device then communicates with enabled remote devices by transmitting and receiving communications such as text, video and voice on the unique links associated with the enabled remote devices as seen in step 1019. In addition, the local device 301 drops unique links to remote devices that have exited the network in step 505 and executes loop 507 as discussed with respect to FIG. 5. According to the embodiment of FIG. 10, the local device 9011 continually updates distance and positional information for both enabled and blocked remote devices. Thus, in executing loop 507, the local device 901 sends a distance and position determining messages to all linked devices as shown in step 1001 and 1105 respectively. The positional map is then displayed on display 213 for each remote device in conference room 900. According to one embodiment, display 213 indicates which remote devices are enabled as positional information is updated. Thus, a seen in FIG. 9, remote devices for which communications are enabled may be indicated by circling the remote devices. As the remote devices X move around conference room 900 (and therefore the display 213), the user of local device 901 can keep track of which devices communications are enabled for viewing the circled Xs on display 213. If the user of the local device 901 at any time wishes to enable or block a particular remote device, the user simply selects or deselects the device on the display 213 as discussed above.

In order to obtain positional information, without external assistance and without the use of know spatial-dependent features (such as antenna patterns), the local device 901 must have at least three known reference points. In the embodiment of FIGS. 9 and 10, the reference points are provided by the fixed location reference devices R1 through R4. However, the three fixed position reference points may be obtained by the local device in a variety of ways. For example, the local device may rely solely on the remote devices to provide reference points. In this embodiment, it is preferable that a large number of remote devices are available to provide reference points in order to resolve ambiguity in positional data to the greatest extent possible.

In another embodiment, the user of the local device may establish the three reference points by moving the remote device to three different positions in free space and "marking" those positions in the remote device. For example, the local device 901 may prompt the user of the local device to move the device to a position one foot in front of the user (e.g., North-South) and press a reference point function key on the input device 215 or 217 to mark that position. The local device will then store that position in relation to all other remote devices in the room. The user may be prompted to make a similar entry into the local device at a position to the right and left of the user in order to provide the necessary reference points for obtaining positions. From this information, the device is able to determine from the change in distances to the other devices in order to resolve ambiguities with regard to position. If an ambiguity still remains, the device prompts the user to move 1 foot (or other distance, where the actual distance moved is not terribly important as long as it is greater than a few wavelengths) in an orthogonal direction (e.g., East-West)

In other embodiments, multiple antennas on the local device 901 may provide the relevant spatial information to resolve the distance. For example, a phased antenna may be used to electronically alter the composite antenna pattern as one way to determine location. Also, the separate antennas may be used in separate location operations such as by performing a switching operation between antennas. Thus, the spatial separation between the antennas is enough to resolve position information, in combination with the known range information. Furthermore, by having multiple antennas that produce a directional antenna pattern, or simply by using a single antenna with a known antenna pattern it possible to resolve the spatial locations of the remote device, although multiple range/location readings may be required by rotating the device. From these examples it should be clear that any number of methods for obtaining the reference points necessary to obtain positional data on remote devices may be used with a wireless UWB device that determines distance to remote devices in accordance with the present invention.

Thus, according to the embodiment of the present invention shown in FIGS. 9 and 10, a local device displays a graphical map of the position of remote devices in relation to the local device and enables communications based on local user's selection of a remote device on the map. In this way, communications with remote devices may be received without the need for the user of the local device to select from among a list of remote devices based on private information about the remote device.

Figure 11:
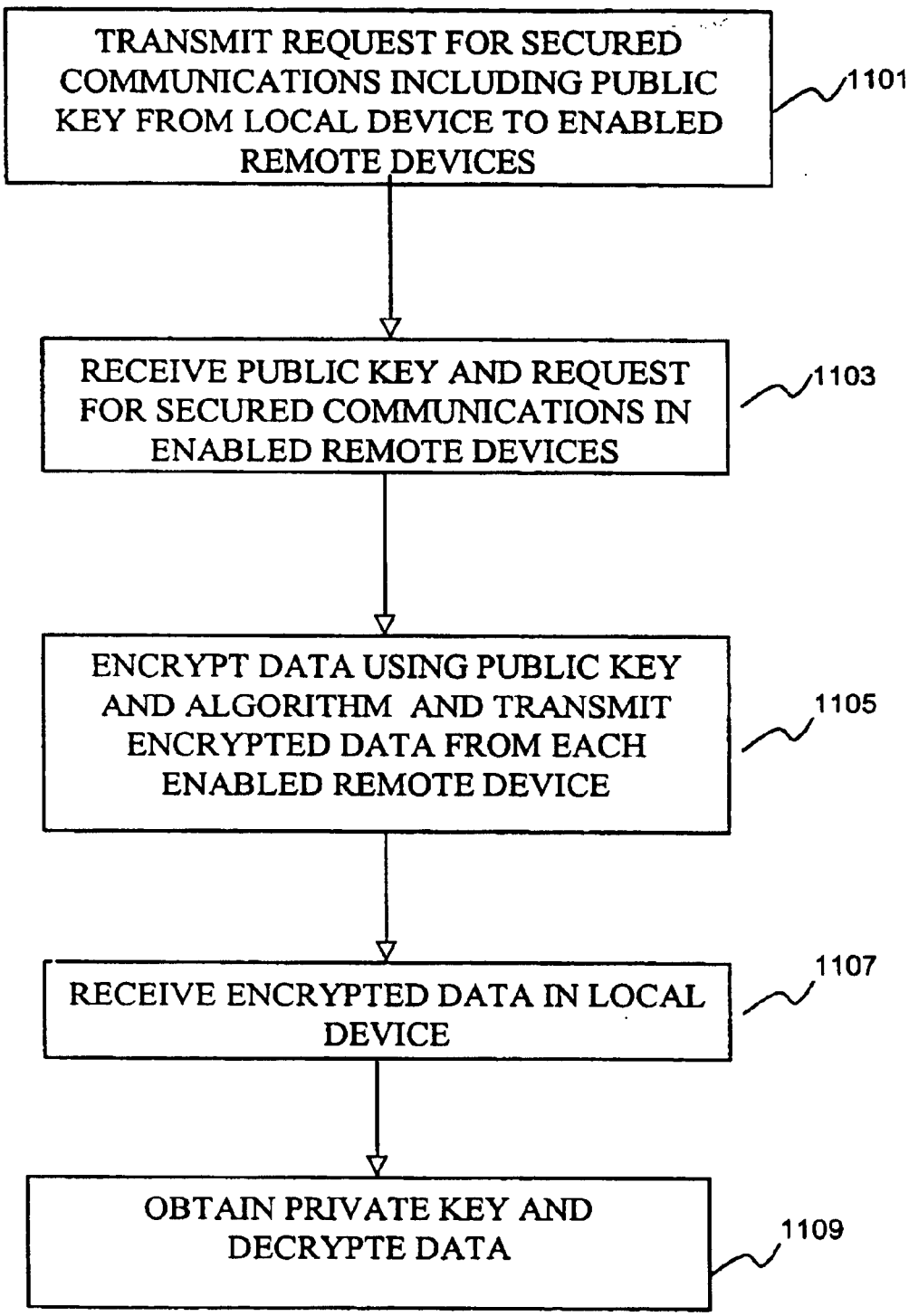
FIG. 11 describes a process for providing secured communications with remote devices in accordance with the present invention.

According to another embodiment of the present invention, communications links enabled by any of the processes previously described may be secured using encryption methods such as the methods described in the text entitled "How The Internet Works", Millennium Edition, Preston Gralla, Macmillan Computer Publishing, Indianapolis 1999 the entire contents of which is incorporated herein by reference. FIG. 11 describes an exemplary process for providing a secured communications link using public key cryptography in accordance with an embodiment of the present invention. In step 1101, the local device 1001 transmits a request for secured communications to enabled remote devices. The request includes the public key of the local device requesting the secured communications. The public key is a key that is shared with any remote device and is used by the remote device to encrypt a data communication intended for the local device. In step 1103, the enabled remote devices receive the request for secured communications and the public key of the local device. Each enabled remote device then decodes the public key and uses the public key to encrypt any message that the remote device intends for the local device as seen in step II 05 encryption is accomplished by applying the public key of the local device and the message to any one of a variety of known encryption algorithms. The encrypted message is then transmitted from the enabled remote device to the local device.

In step 1105, the local device receives the encrypted message which is unintelligible. Any device that may intercept the encrypted message will not be able to decrypt the message even if the intercepting device has the public key of the local device because a private key that only the local device is needed to decrypt the unintelligible message. In step 1109, the local device obtains its private key from memory and decrypts the encrypted message using the private key. Thus, secure communications can be provided for any one of the discussed embodiments for enabling communications based on distance information described above. In addition, it is to be understood that while the process disclosed in FIG. 11 describes one way encryption, two way encryption may be similarly provided by the local device obtaining the public key of the remote device for which secured communications is to take place. Moreover, in addition to encryption, guaranteeing the source of a particular message, such as digital certificates and other means of authentication may also be applied to the present invention. In this regard, the security and authentication methods described in any one of "How The Internet Works", the IEEE 802.11 standard, and the Blue Tooth Specification referenced above may be used in accordance with the present invention.

Obviously, numerous modifications and variations of the present invention are possible in light of the above teachings. For example, any one of the above described processes for enabling device functions and communications may be modified by use of signal strength information provided in any known manner. It is therefore to be understood that within the scope of the appended claims, the invention may be practiced otherwise than as specifically described herein.

What is claimed is:

1. A method for using timing information as at least one input parameter for a function performed in a local device comprising steps for:

transmitting a message from the local device to a remote device via an ultra wide band (UWB) wireless medium;

receiving a response from said remote device via said UWB wireless medium;

determining an amount of time between said transmitting step being executed and said receiving step being executed;

performing a function in said local device with said amount of time being said at least one input parameter; and determining a distance from said local device to said remote device based on said amount of time, wherein said step of performing a function in said local device comprises performing said function based on said distance determined, wherein said step of performing a function in said local device comprises communicating with said remote device based on said distance determined, and wherein said step of communicating with said remote device comprises substeps of:

setting an authentication criteria in said local device;

comparing said authentication criteria with said distance between the local device and the remote device;

enabling communications with said remote device if said distance satisfies said authentication criteria; and blocking communications with said remote device if said distance does not satisfy said authentication criteria.

2. The method of claim 1, further comprising steps of:

updating distance information after a predetermined time; and enabling or disabling communications to said remote device based on the updated distance information.

3. The method of claim 1, further comprising steps of:

updating distance information only when communications to said remote device are blocked; and enabling communications with said remote device based on the updated distance information.

* * * * *